(12) United States Patent
Nazarifar et al.

(10) Patent No.: US 12,447,257 B2
(45) Date of Patent: Oct. 21, 2025

(54) SYSTEMS AND METHODS FOR PROVIDING A PULSELESS PERISTALTIC PUMP

(71) Applicant: Johnson & Johnson Surgical Vision, Inc., Irvine, CA (US)

(72) Inventors: Nader Nazarifar, Laguna Niguel, CA (US); John C. Dunne, Jr., Costa Mesa, CA (US); Eric N. Anderfaas, Westminster, CA (US); John Huculak, Mission Viejo, CA (US)

(73) Assignee: Johnson & Johnson Surgical Vision, Inc., Irvine, CA (US)

( * ) Notice: Subject to any disclaimer, the term of this patent is extended or adjusted under 35 U.S.C. 154(b) by 300 days.

(21) Appl. No.: 17/124,479

(22) Filed: Dec. 16, 2020

(65) Prior Publication Data

US 2021/0178034 A1 Jun. 17, 2021

Related U.S. Application Data

(60) Provisional application No. 62/949,435, filed on Dec. 17, 2019.

(51) Int. Cl.
*A61M 1/00* (2006.01)

(52) U.S. Cl.
CPC ......... *A61M 1/774* (2021.05); *A61M 2205/02* (2013.01); *A61M 2205/121* (2013.01);
(Continued)

(58) Field of Classification Search
CPC .. A61M 1/72; A61M 3/0201; A61M 2205/12; A61M 1/74; A61M 2210/0612; A61M 3/0258; A61M 5/14232; A61M 1/00; F04B 43/1276; F04B 43/1269; F04B 43/1261

See application file for complete search history.

(56) References Cited

U.S. PATENT DOCUMENTS

| | | |
|---|---|---|
| 1,848,024 A | 3/1932 | Owen |
| 1,949,574 A | 3/1934 | Miller |

(Continued)

FOREIGN PATENT DOCUMENTS

| | | |
|---|---|---|
| CA | 2758073 C | 5/2017 |
| CN | 104583743 A | 4/2015 |

(Continued)

OTHER PUBLICATIONS

"Phacoemulsification", retrieved from https://en.wikipedia.org/wiki/Phacoemulsification, 2 pages, retrieved on Jul. 1, 2009.
(Continued)

*Primary Examiner* — Scott J Medway

(57) ABSTRACT

A system for a surgical system is disclosed, comprising system for distributing fluid in a surgical cassette, comprising at least one at least partially deformable bladder at least partially disposed on at least one rigid surface, wherein the bladder forms a portion of a channel, at least a first and second port in fluid communication with the channel, wherein the channel comprises at least two portions having a substantially uniform first dimension separated by a second portion have a second dimension, and wherein at least two pump head rollers are engaged with the bladder.

18 Claims, 14 Drawing Sheets

(52) U.S. Cl.
CPC ............... *A61M 2205/123* (2013.01); *A61M 2210/0612* (2013.01)

(56) References Cited

U.S. PATENT DOCUMENTS

| | | | |
|---|---|---|---|
| 2,466,618 A * | 4/1949 | Kingsley | F04B 43/1223 |
| | | | 417/477.14 |
| 2,841,091 A * | 7/1958 | Schaurte | F04B 43/14 |
| | | | 92/93 |
| 2,899,907 A * | 8/1959 | Becher | F04B 43/0072 |
| | | | 417/477.6 |
| 3,005,345 A | 10/1961 | Kaufman et al. | |
| 3,116,697 A | 1/1964 | Bilichniansky | |
| 3,693,613 A | 9/1972 | Kelman | |
| 3,723,030 A | 3/1973 | Gelfand | |
| 3,781,142 A | 12/1973 | Zweig | |
| 3,816,033 A | 6/1974 | Fried et al. | |
| 3,876,340 A | 4/1975 | Thomas | |
| 3,927,955 A | 12/1975 | Spinosa et al. | |
| 3,955,902 A | 5/1976 | Kyvsgaard | |
| 3,999,891 A * | 12/1976 | Galea | F04B 43/1253 |
| | | | 417/477.14 |
| 4,178,138 A | 12/1979 | Iles | |
| 4,189,286 A | 2/1980 | Murry et al. | |
| 4,193,004 A | 3/1980 | Lobdell et al. | |
| 4,201,525 A | 5/1980 | Brown et al. | |
| 4,205,948 A * | 6/1980 | Jones | F04B 43/1253 |
| | | | 417/477.6 |
| 4,297,089 A | 10/1981 | Giardini | |
| 4,369,785 A | 1/1983 | Rehkopf et al. | |
| 4,515,584 A | 5/1985 | Abe et al. | |
| 4,530,647 A | 7/1985 | Uno | |
| 4,564,342 A | 1/1986 | Weber et al. | |
| 4,644,177 A | 2/1987 | Barabino | |
| 4,671,116 A | 6/1987 | Glennon et al. | |
| 4,758,238 A | 7/1988 | Sundblom et al. | |
| 4,773,897 A | 9/1988 | Scheller et al. | |
| 4,842,584 A | 6/1989 | Pastrone | |
| 4,878,622 A | 11/1989 | Jamison et al. | |
| 4,909,713 A | 3/1990 | Finsterwald et al. | |
| 4,920,336 A | 4/1990 | Meijer | |
| 4,982,903 A | 1/1991 | Jamison et al. | |
| 4,983,901 A | 1/1991 | Lehmer | |
| 4,997,347 A | 3/1991 | Roos | |
| 5,006,110 A | 4/1991 | Garrison et al. | |
| 5,062,775 A | 11/1991 | Orth | |
| 5,084,031 A | 1/1992 | Todd et al. | |
| 5,125,891 A | 6/1992 | Hossain et al. | |
| 5,195,960 A | 3/1993 | Hossain et al. | |
| 5,195,961 A | 3/1993 | Takahashi et al. | |
| 5,195,971 A | 3/1993 | Sirhan | |
| 5,230,614 A | 7/1993 | Zanger et al. | |
| 5,235,179 A | 8/1993 | Chang et al. | |
| 5,267,956 A | 12/1993 | Beuchat | |
| 5,268,624 A | 12/1993 | Zanger | |
| 5,282,787 A | 2/1994 | Wortrich | |
| 5,340,290 A * | 8/1994 | Clemens | F04B 43/1292 |
| | | | 417/477.1 |
| 5,342,181 A | 8/1994 | Schock et al. | |
| 5,342,293 A | 8/1994 | Zanger | |
| 5,360,398 A | 11/1994 | Grieshaber et al. | |
| 5,454,783 A | 10/1995 | Grieshaber et al. | |
| 5,468,129 A * | 11/1995 | Sunden | F16L 11/121 |
| | | | 138/119 |
| 5,470,211 A | 11/1995 | Knott et al. | |
| 5,499,969 A | 3/1996 | Beuchat et al. | |
| 5,520,652 A | 5/1996 | Peterson | |
| 5,540,668 A | 7/1996 | Wilson, Jr. et al. | |
| 5,549,461 A | 8/1996 | Newland | |
| 5,591,127 A | 1/1997 | Barwick jr. et al. | |
| 5,591,344 A | 1/1997 | Kenley et al. | |
| 5,646,727 A * | 7/1997 | Hammer | G01N 35/1095 |
| | | | 356/315 |
| 5,657,000 A | 8/1997 | Ellingboe | |
| 5,676,530 A | 10/1997 | Nazarifar | |
| 5,676,650 A | 10/1997 | Grieshaber et al. | |
| 5,693,020 A | 12/1997 | Rauh | |
| 5,700,240 A | 12/1997 | Barwick, Jr. et al. | |
| 5,733,256 A | 3/1998 | Costin | |
| 5,747,824 A | 5/1998 | Jung et al. | |
| 5,810,766 A | 9/1998 | Barnitz et al. | |
| 5,830,176 A | 11/1998 | Mackool | |
| 5,840,069 A * | 11/1998 | Robinson | F04B 43/1269 |
| | | | 604/153 |
| 5,897,524 A | 4/1999 | Wortrich et al. | |
| 5,899,674 A | 5/1999 | Jung et al. | |
| 5,916,201 A | 6/1999 | Wilson, Jr. et al. | |
| 5,928,257 A | 7/1999 | Kablik et al. | |
| 5,941,696 A * | 8/1999 | Fenstermacher | F04B 43/1292 |
| | | | 417/477.6 |
| 6,024,428 A | 2/2000 | Uchikata | |
| 6,033,060 A | 3/2000 | Minami | |
| 6,062,829 A | 5/2000 | Ognier | |
| 6,086,598 A | 7/2000 | Appelbaum et al. | |
| 6,113,578 A | 9/2000 | Brown | |
| 6,117,126 A | 9/2000 | Appelbaum et al. | |
| 6,138,508 A | 10/2000 | Hannan et al. | |
| 6,150,623 A | 11/2000 | Chen | |
| 6,179,829 B1 | 1/2001 | Bisch et al. | |
| 6,260,434 B1 | 7/2001 | Holtorf | |
| 6,261,283 B1 | 7/2001 | Morgan et al. | |
| 6,274,880 B1 | 8/2001 | Walker | |
| 6,293,926 B1 | 9/2001 | Sorensen et al. | |
| 6,296,460 B1 * | 10/2001 | Smith | F04B 43/14 |
| | | | 417/475 |
| 6,360,630 B2 | 3/2002 | Holtorf | |
| 6,436,072 B1 | 8/2002 | Kullas et al. | |
| 6,452,120 B1 | 9/2002 | Chen | |
| 6,452,123 B1 | 9/2002 | Chen | |
| 6,491,661 B1 | 12/2002 | Boukhny et al. | |
| 6,494,693 B1 * | 12/2002 | Sunden | F04B 43/0072 |
| | | | 417/474 |
| 6,497,680 B1 | 12/2002 | Holst et al. | |
| 6,511,454 B1 | 1/2003 | Nakao et al. | |
| 6,561,999 B1 | 5/2003 | Nazarifar et al. | |
| 6,572,349 B2 | 6/2003 | Sorensen et al. | |
| 6,632,214 B2 | 10/2003 | Morgan et al. | |
| 6,672,336 B2 | 1/2004 | Nichols | |
| 6,674,030 B2 | 1/2004 | Chen et al. | |
| 6,685,450 B2 | 2/2004 | Bandis et al. | |
| 6,740,074 B2 | 5/2004 | Morgan et al. | |
| 6,942,637 B2 | 9/2005 | Cartledge et al. | |
| 6,962,488 B2 | 11/2005 | Davis et al. | |
| 7,012,203 B2 | 3/2006 | Hanson et al. | |
| 7,070,578 B2 | 7/2006 | Leukanech et al. | |
| 7,169,123 B2 | 1/2007 | Kadziauskas et al. | |
| 7,244,240 B2 | 7/2007 | Nazarifar et al. | |
| 7,300,264 B2 | 11/2007 | Souza | |
| 7,344,894 B2 | 3/2008 | Greenstein et al. | |
| 7,393,189 B2 | 7/2008 | Davis et al. | |
| 7,486,976 B1 | 2/2009 | Belotserkovsky | |
| 7,513,757 B2 | 4/2009 | Gibson et al. | |
| 7,535,571 B2 | 5/2009 | Dietz et al. | |
| 7,594,901 B2 | 9/2009 | Hopkins et al. | |
| 7,614,857 B2 | 11/2009 | Fuechslin et al. | |
| 7,625,189 B2 | 12/2009 | Cheng | |
| 7,648,465 B2 | 1/2010 | Gordon | |
| 7,695,447 B2 | 4/2010 | Khashayar et al. | |
| 7,764,370 B2 | 7/2010 | Williams et al. | |
| 7,775,780 B2 | 8/2010 | Hopkins et al. | |
| 7,786,457 B2 | 8/2010 | Gao | |
| 7,872,746 B2 | 1/2011 | Gao et al. | |
| 7,956,341 B2 | 6/2011 | Gao | |
| 8,011,905 B2 | 9/2011 | Artsyukhovich et al. | |
| 8,070,712 B2 | 12/2011 | Muri et al. | |
| 8,096,186 B2 | 1/2012 | Butterfield | |
| 8,251,944 B2 | 8/2012 | Hopkins et al. | |
| 8,303,542 B2 | 11/2012 | Walter et al. | |
| 8,343,100 B2 | 1/2013 | King et al. | |
| 8,398,582 B2 | 3/2013 | Gordon et al. | |
| 8,430,840 B2 | 4/2013 | Nazarifar et al. | |
| 8,465,467 B2 | 6/2013 | Gao | |
| 8,469,050 B2 | 6/2013 | King | |
| 8,491,528 B2 | 7/2013 | Muri et al. | |

(56) References Cited

U.S. PATENT DOCUMENTS

| | | |
|---|---|---|
| 8,500,421 B2 | 8/2013 | Domash et al. |
| 8,545,198 B2 | 10/2013 | Artsyukhovich et al. |
| D698,019 S | 1/2014 | Oliveira |
| 8,656,955 B2 | 2/2014 | Price |
| 8,689,831 B2 | 4/2014 | Whiting et al. |
| 8,770,226 B2 | 7/2014 | Wilen et al. |
| 8,790,096 B2 | 7/2014 | Sorensen |
| 8,876,757 B2 | 11/2014 | Jacobson et al. |
| 8,894,605 B2 | 11/2014 | Eichler |
| 8,905,731 B2 | 12/2014 | Baron |
| 8,998,864 B2 | 4/2015 | Perkins et al. |
| 9,119,701 B2 | 9/2015 | Gordon |
| 9,149,568 B2 | 10/2015 | Gerg et al. |
| 9,482,216 B2 | 11/2016 | Sorensen |
| 9,561,321 B2 | 2/2017 | Sorensen et al. |
| 9,593,370 B2 | 3/2017 | Jones |
| 9,625,044 B2 | 4/2017 | Bjernulf et al. |
| 9,713,660 B2 * | 7/2017 | Baxter .................. A61M 1/72 |
| 10,253,767 B2 * | 4/2019 | Minatodani ......... F04B 43/1253 |
| 10,327,948 B2 | 6/2019 | Jacobson et al. |
| 10,723,121 B2 | 7/2020 | Wan |
| 11,110,218 B2 * | 9/2021 | Kuntz .................. A61M 1/74 |
| 11,639,717 B2 * | 5/2023 | Fritzsch ............... C12M 45/00 |
| | | 417/477.1 |
| 2001/0051788 A1 | 12/2001 | Paukovits et al. |
| 2002/0019607 A1 | 2/2002 | Bui |
| 2002/0036276 A1 | 3/2002 | Seeman |
| 2003/0039728 A1 | 2/2003 | Herrick et al. |
| 2003/0073980 A1 | 4/2003 | Finlay et al. |
| 2003/0108429 A1 | 6/2003 | Angelini et al. |
| 2003/0199803 A1 | 10/2003 | Robinson et al. |
| 2004/0037724 A1 | 2/2004 | Haser et al. |
| 2005/0054971 A1 | 3/2005 | Steen et al. |
| 2005/0069419 A1 | 3/2005 | Cull et al. |
| 2005/0070859 A1 | 3/2005 | Cull et al. |
| 2005/0118048 A1 | 6/2005 | Traxinger |
| 2005/0245888 A1 | 11/2005 | Cull |
| 2006/0145540 A1 | 7/2006 | Mezhinsky |
| 2006/0154327 A1 | 7/2006 | Bachur et al. |
| 2006/0211913 A1 | 9/2006 | Dlugos et al. |
| 2006/0219049 A1 | 10/2006 | Horvath et al. |
| 2006/0219962 A1 | 10/2006 | Dancs et al. |
| 2007/0016174 A1 | 1/2007 | Millman et al. |
| 2007/0049898 A1 | 3/2007 | Hopkins et al. |
| 2007/0073234 A1 | 3/2007 | Nazarifar et al. |
| 2007/0239149 A1 | 10/2007 | Lieponis |
| 2007/0244427 A1 | 10/2007 | Nazarifar |
| 2007/0278155 A1 * | 12/2007 | Lo ...................... A61M 1/3627 |
| | | 210/646 |
| 2007/0287959 A1 | 12/2007 | Walter et al. |
| 2008/0000485 A1 | 1/2008 | Williams et al. |
| 2008/0033342 A1 | 2/2008 | Staggs |
| 2008/0051674 A1 | 2/2008 | Davenport et al. |
| 2008/0066542 A1 | 3/2008 | Gao |
| 2008/0112828 A1 | 5/2008 | Muri et al. |
| 2008/0114289 A1 | 5/2008 | Muri et al. |
| 2008/0114290 A1 | 5/2008 | King et al. |
| 2008/0114291 A1 | 5/2008 | Muri et al. |
| 2008/0114300 A1 | 5/2008 | Muri et al. |
| 2008/0114301 A1 | 5/2008 | Bandhauer et al. |
| 2008/0114311 A1 | 5/2008 | Muri et al. |
| 2008/0114312 A1 | 5/2008 | Muri et al. |
| 2008/0114372 A1 | 5/2008 | Edwards et al. |
| 2008/0114387 A1 | 5/2008 | Hertweck et al. |
| 2008/0125698 A1 | 5/2008 | Gerg et al. |
| 2009/0013780 A1 | 1/2009 | Gao et al. |
| 2009/0035165 A1 | 2/2009 | Chang |
| 2009/0043178 A1 | 2/2009 | Belotserkovsky |
| 2009/0299279 A1 | 12/2009 | Richter |
| 2010/0134303 A1 | 6/2010 | Perkins |
| 2010/0249693 A1 | 9/2010 | Links |
| 2011/0112472 A1 | 5/2011 | Jacobson et al. |
| 2011/0184342 A1 | 7/2011 | Pesach et al. |
| 2011/0232388 A1 | 9/2011 | Butterfield |
| 2012/0097567 A1 | 4/2012 | Zhao et al. |
| 2012/0138523 A1 | 6/2012 | Matula et al. |
| 2012/0172785 A1 | 7/2012 | Belley et al. |
| 2013/0072871 A1 | 3/2013 | Ozturk |
| 2013/0150782 A1 | 6/2013 | Sorensen et al. |
| 2013/0231606 A1 | 9/2013 | Stearns et al. |
| 2014/0081197 A1 | 3/2014 | Farivar |
| 2015/0148615 A1 | 5/2015 | Brennan et al. |
| 2016/0166742 A1 | 6/2016 | Layser et al. |
| 2016/0175578 A1 | 6/2016 | Roholt |
| 2016/0305916 A1 | 10/2016 | Olovsson |
| 2016/0313289 A1 | 10/2016 | Olovsson et al. |
| 2017/0042730 A1 | 2/2017 | He et al. |
| 2017/0042733 A1 | 2/2017 | Sorensen et al. |
| 2017/0108141 A1 | 4/2017 | Miller, III et al. |
| 2017/0138504 A1 | 5/2017 | Hoots et al. |
| 2017/0189231 A1 | 7/2017 | Baxter et al. |
| 2017/0273826 A1 | 9/2017 | Sanchez, Jr. |
| 2017/0321813 A1 | 11/2017 | Olovsson et al. |
| 2018/0306613 A1 | 10/2018 | Ciou et al. |
| 2019/0101661 A1 | 4/2019 | Ozdemir et al. |
| 2019/0133822 A1 | 5/2019 | Banko |
| 2019/0184072 A1 | 6/2019 | Madden et al. |
| 2019/0275219 A1 | 9/2019 | Ehlert et al. |
| 2019/0307608 A1 | 10/2019 | Lee et al. |
| 2020/0072210 A1 * | 3/2020 | Barth ................... F04B 43/12 |
| 2020/0256331 A1 | 8/2020 | Chen et al. |
| 2020/0353133 A1 | 11/2020 | Gao et al. |
| 2020/0368406 A1 | 11/2020 | Whisler et al. |
| 2021/0100938 A1 * | 4/2021 | McDonell ............. F04B 43/02 |
| 2021/0177654 A1 * | 6/2021 | Dunne, Jr. ........... A61M 3/022 |
| 2021/0178031 A1 * | 6/2021 | Mehta ................ A61M 3/0212 |
| 2021/0178033 A1 * | 6/2021 | Nazarifar ............... A61M 1/72 |
| 2021/0220545 A1 | 7/2021 | Anderfaas et al. |
| 2021/0259884 A1 | 8/2021 | Heeren et al. |
| 2024/0108794 A1 * | 4/2024 | Wood ................... A61M 1/80 |

FOREIGN PATENT DOCUMENTS

| | | |
|---|---|---|
| CN | 108128749 A | 6/2018 |
| CN | 110537129 A | 12/2019 |
| DE | 10039765 A1 | 2/2002 |
| EP | 0056019 A1 | 7/1982 |
| EP | 0197705 B1 | 6/1992 |
| EP | 0777111 A1 | 6/1997 |
| EP | 1010437 A1 | 6/2000 |
| EP | 1310267 A2 | 5/2003 |
| EP | 1704839 A1 | 9/2006 |
| EP | 1787606 A1 | 5/2007 |
| EP | 1867349 A1 | 12/2007 |
| EP | 1873501 A1 | 1/2008 |
| EP | 1900347 A1 | 3/2008 |
| EP | 1935383 A1 | 6/2008 |
| EP | 2305174 A1 | 4/2011 |
| EP | 2344790 B1 | 9/2014 |
| EP | 1928518 B1 | 4/2016 |
| EP | 3318291 A1 | 5/2018 |
| GB | 1399243 A | 6/1975 |
| GB | 2230301 A | 10/1990 |
| JP | 2019110313 A | 7/2019 |
| WO | 9315777 A2 | 8/1993 |
| WO | 9317729 A1 | 9/1993 |
| WO | 9324082 A1 | 12/1993 |
| WO | 9632144 A1 | 10/1996 |
| WO | 9818507 A1 | 5/1998 |
| WO | 9917818 A1 | 4/1999 |
| WO | 0070225 A1 | 11/2000 |
| WO | 0234314 A1 | 5/2002 |
| WO | 2005084728 A2 | 9/2005 |
| WO | 2005092023 A2 | 10/2005 |
| WO | 2007143677 A2 | 12/2007 |
| WO | 2008060859 A1 | 5/2008 |
| WO | 2008060902 A1 | 5/2008 |
| WO | 2008060958 A1 | 5/2008 |
| WO | 2014005769 A2 | 1/2014 |
| WO | 2016122790 A1 | 8/2016 |

(56) References Cited

FOREIGN PATENT DOCUMENTS

WO        2019093880 A1     5/2019
WO        2020225643 A1    11/2020

OTHER PUBLICATIONS

"Water Structure and Science", Water Absorption Spectrum, 6 pages, Dec. 17, 2009.
Extended European Search Report, received for European Application No. 20828337.4, mailed on Dec. 12, 2024, 7 pages.
Weber, Peter, "Optischer Sensor miBt Fullstande in Glasrohren", Feinwerktechnik & Messtechnik, vol. 99, pp. 31-33, 1991.

* cited by examiner

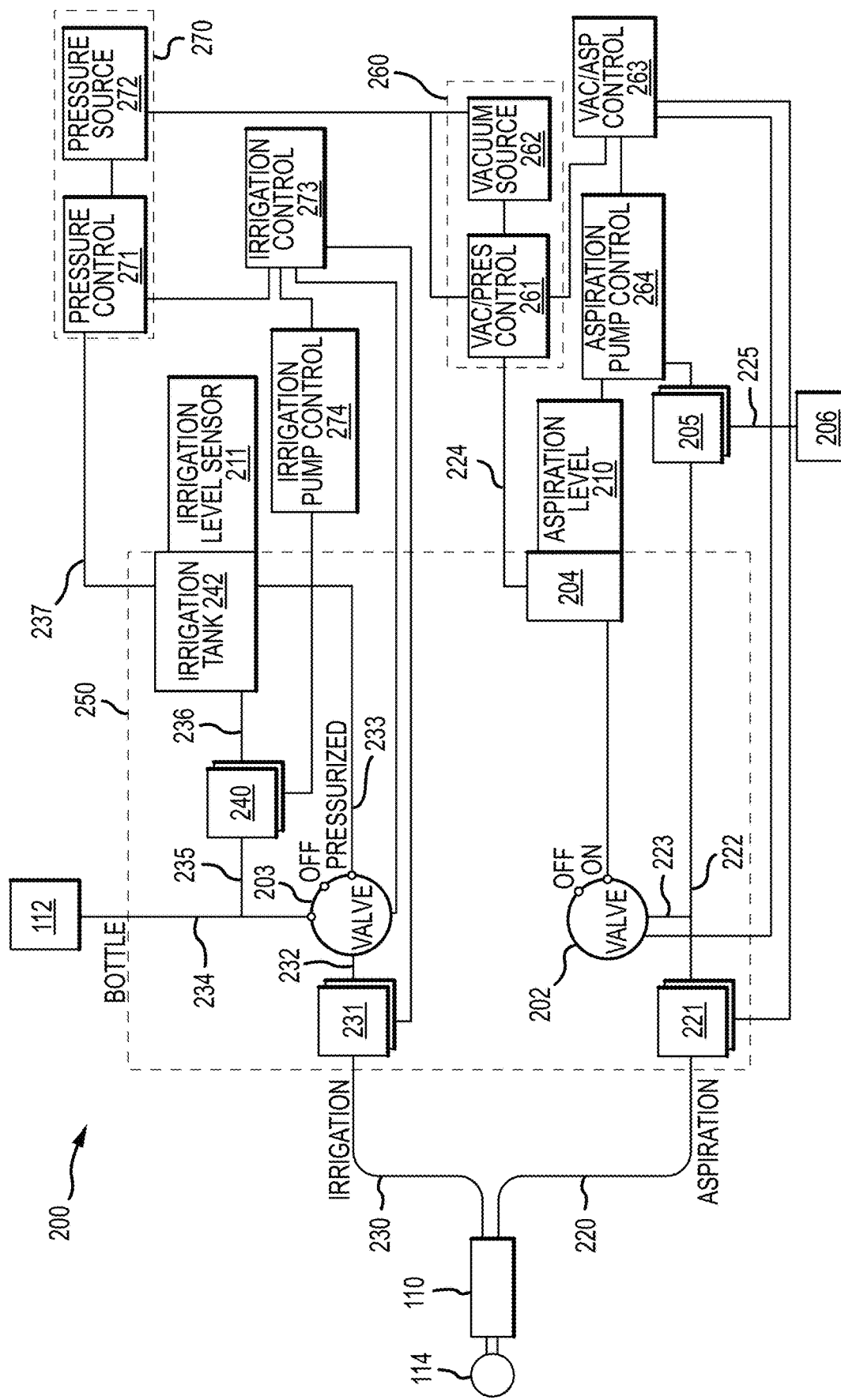

SYSTEMS AND METHODS FOR PROVIDING A PULSELESS PERISTALTIC PUMP

CROSS REFERENCE TO RELATED APPLICATIONS

This application claims the benefit under 35 U.S.C. § 119(e) of U.S. Provisional Patent Application No. 62/949,435, filed Dec. 17, 2019, which is incorporated herein by reference in its entirety.

BACKGROUND OF THE INVENTION

Field of Technology

The present invention relates generally to a system for distributing fluid in a surgical cassette, a more specifically a bladder channel network designed to minimize pulsing during pumping action.

Description of the Background

The optical elements of the eye include both a cornea (at the front of the eye) and a lens within the eye. The lens and cornea work together to focus light onto the retina at the back of the eye. The lens also changes in shape, adjusting the focus of the eye to vary between viewing near objects and far objects. The lens is found just behind the pupil and within a capsular bag, the capsular bag being a thin, relatively delicate structure which separates the eye into anterior and posterior chambers.

With age, clouding of the lens or cataracts is fairly common. Cataracts may form in the hard central nucleus of the lens, in the softer peripheral cortical portion of the lens, or at the back of the lens near the capsular bag. Cataracts can be treated by the replacement of the cloudy lens with an artificial lens. Phacoemulsification systems often use ultrasound energy to fragment the lens and aspirate the lens material from within the capsular bag. This may allow the capsular bag to be used for positioning of the artificial lens and maintains the separation between the anterior portion of the eye and the vitreous humor in the posterior chamber of the eye.

During cataract surgery and other therapies of the eye, accurate control over the volume of fluid within the eye is highly beneficial. For example, while ultrasound energy breaks up the lens and allows it to be drawn into a treatment probe with an aspiration flow, a corresponding irrigation flow may be introduced into the eye so that the total volume of fluid in the eye does not change excessively. If the total volume of fluid in the eye is allowed to get too low at any time during the procedure, the eye may collapse and cause significant tissue damage. Similarly, excessive pressure within the eye may strain and injure tissues of the eye.

While a variety of specific fluid transport mechanisms may be used in phacoemulsification and other treatment systems for the eyes, aspiration flow systems can generally be classified in two categories: 1) volumetric based aspiration flow systems using positive displacement pumps (e.g. peristaltic); and 2) vacuum-based aspiration systems using a vacuum source, typically applied to the aspiration flow through an air-liquid interface within a reservoir (e.g. Venturi). Both systems may be incorporated into one treatment system and/or cassette. Cassette ("pack") systems can be used to couple peristaltic pump drive rotors and/or vacuum systems of the surgical consoles to an eye treatment handpiece, with the flow network conduit of the cassette being disposable to avoid cross-contamination between different patients.

To mitigate any such occurrences of cross-contamination between different patients, staff operating a system typically begin each procedure with afresh cassette and irrigation source prior to each case and monitor the fluid visually throughout surgery. However, conventional configurations do not efficiently provide for easily exchangeable cassettes which can optimally perform certain intended functions. As such, improvements are needed in the art to address these issues.

SUMMARY

A surgical system is disclosed, comprising a system for distributing fluid in a surgical cassette, comprising at least one at least partially deformable bladder at least partially disposed on at least one rigid surface, wherein the bladder forms a portion of a channel, at least a first and second port in fluid communication with the channel, wherein the channel comprises at least two portions having a substantially uniform first dimension separated by a second portion have a second dimension, and wherein at least two pump head rollers are engaged with the bladder.

DESCRIPTION OF THE DRAWINGS

The accompanying drawings are included to provide a further understanding of the invention and are incorporated in and constitute a part of this specification. The drawings illustrate disclosed embodiments and/or aspects and, together with the description, serve to explain the principles of the invention, the scope of which is determined by the claims.

FIG. 2 is a functional block diagram of an exemplary cassette system for an eye treatment system under one embodiment;

DETAILED DESCRIPTION OF THE INVENTION

Figure 1A:
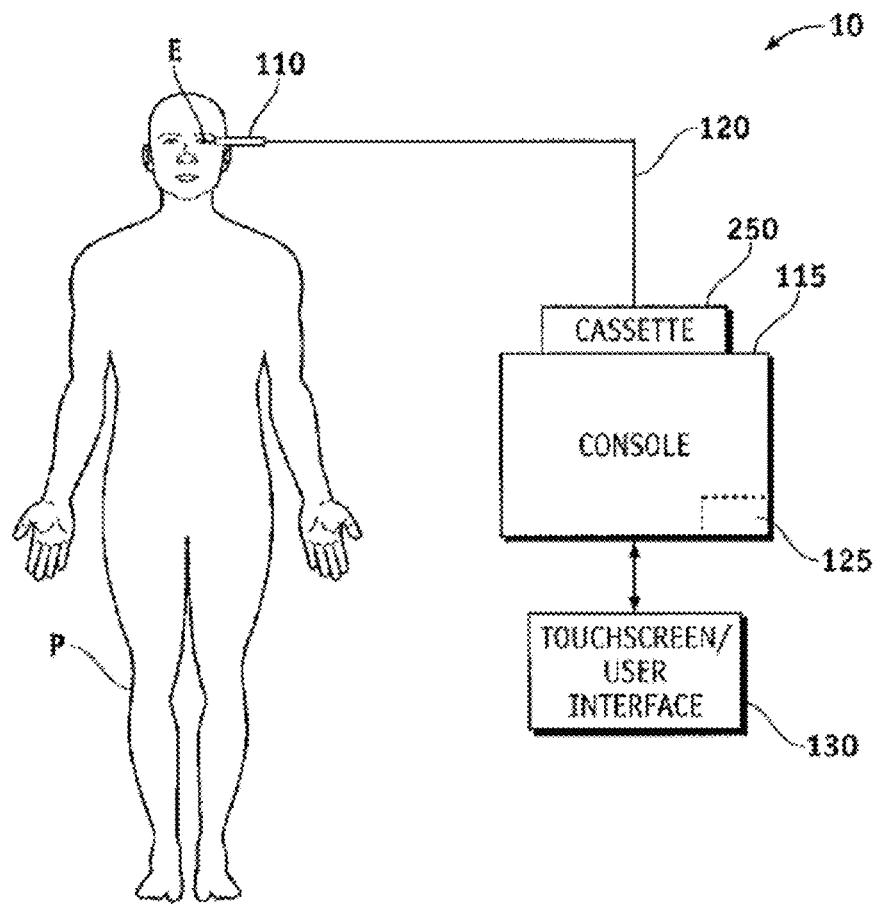
FIG. 1A is a schematic illustrating an eye treatment system in which a cassette is coupled to an eye treatment probe with an eye treatment console under one embodiment.

It is to be understood that the figures and descriptions of the present invention have been simplified to illustrate elements that are relevant for a clear understanding of the present invention, while eliminating, for the purpose of clarity, many other elements found in typical surgical, and particularly optical surgical, apparatuses, systems, and methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to the disclosed elements and methods known to those skilled in the art.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that exemplary embodiments may be embodied in different forms. As such, the exemplary embodiments should not be construed to limit the scope of the disclosure. As referenced above, in some exemplary embodiments, well-known processes, well-known device structures, and well-known technologies may not be described in detail.

A surgical cassette, also referred to as a medical pack, a fluidic cassette, or simply, a cassette, is used to facilitate irrigation and aspiration during surgical procedures, such as phacoemulsification surgery. The surgical cassette may be inserted and mounted to a surgical console and become part of an overall phacoemulsification surgery system. The surgical cassette may perform a myriad of functions, such as effluent material collection, tube pressure sensing, and control the flow of fluid through tubing encased within the cassette and between a surgical handpiece and a surgical console.

A surgical cassette typically comprises a front plate and a back plate, and may also include a gasket at least partially there between. The front plate and back plate may also be welded together to avoid the use of a gasket or other intermediate portion. Molded within either/or the front plate and the back plate may be pathways for tubing to be inserted thereby creating desired pathways for the tubing around the gasket. In an embodiment where there is a gasket, the gasket may comprise one or more valves and one or more sensors to promote fluid flow through the tubing along the desired pathways. In an embodiment where there is no gasket, any valves known in the art may be used, e.g. rotary valve.

Surgical cassettes may utilize different types of sensors to monitor vacuum, flow, and/or pressure of certain fluid lines or channels during the surgical process. Other single use cassettes may use a low cost pressure diaphragm on the cassette with a console mounted Linear Variable Differential Transformer (LVDT) to measure the deflection of the pressure diaphragm with either a low rate spring pushing the LVDT against the surface of the pressure diaphragm or a magnet coupling the LVDT to the surface of the diaphragm, or a combination of both a spring and magnet. The spring force and/or friction force associated with movement of the LVDT sensing element reduces the accuracy and repeatability of this type system. Other systems may use laser triangulation displacement sensors to measure the deflection of a pressure diaphragm. In addition, other systems may use a ferromagnetic element in the cassette which couples to a magnetic element in the console, which may be coupled with a strain gauge.

Referring now to FIG. 1A, a system 10 for treating an eye E of a patient P generally includes an eye treatment probe handpiece 110 coupled with a console 115 by a cassette 250. Handpiece 110 generally includes a handle for manually manipulating and supporting an insertable probe tip. The probe tip has a distal end which is insertable into the eye, with one or more lumens in the probe tip allowing irrigation fluid to flow from console 115 and/or cassette 250 into the eye. Aspiration fluid may also be withdrawn through a lumen of the probe tip, with console 115 and cassette 250 generally including a vacuum aspiration source, a positive displacement aspiration pump, or both to help withdraw and control a flow of surgical fluids into and out of eye E. As the surgical fluids may include biological materials that should not be transferred between patients, cassette 250 will often comprise a sterilizable (or alternatively, disposable) structure, with the surgical fluids being transmitted through flexible and/or rigid conduits 120 of cassette 250 that avoid direct contact in between those fluids and the components of console 115.

When a distal end of the probe tip of handpiece 110 is inserted into an eye E, for example, for removal of a lens of a patient P with cataracts, an electrical conductor and/or pneumatic line (not shown) may supply energy from console 115 to an ultrasound transmitter of handpiece 110, a cutter mechanism, or the like. Alternatively, handpiece 110 may be configured as an irrigation/aspiration (I/A) and/or vitrectomy handpiece. Also, the ultrasonic transmitter may be replaced by other means for emulsifying a lens, such as a high energy laser beam. The ultrasound energy from handpiece 110 helps to fragment the tissue of the lens, which can then be drawn into a port of the tip by aspiration flow. So as to balance the volume of material removed by the aspiration flow, an irrigation flow through handpiece 110 (or a separate probe structure) may also be provided, with both the aspiration and irrigation flows being controlled by console 115.

To avoid cross-contamination between patients without incurring excessive expenditures for each procedure, cassette 250 and its flexible conduits 120 may be disposable. However, the flexible conduit or tubing may be disposable, with the cassette body and/or other structures of the cassette being sterilizable. Cassette 250 may be configured to interface with reusable components of console 115, including, but not limited to, peristaltic pump rollers, a Venturi or other vacuum source, a controller 125, and/or the like.

Console 115 may include controller 125, which may include an embedded microcontroller and/or many of the components common to a personal computer, such as a processor, data bus, a memory, input and/or output devices (including a user interface 130 (e.g. touch screen, graphical user interface (GUI), etc.), and the like. Controller 125 will often include both hardware and software, with the software typically comprising machine readable code or programming instructions for implementing one, some, or all of the methods described herein. The code may be embodied by a tangible media such as a memory, a magnetic recording media, an optical recording media, or the like. Controller 125 may have (or be coupled with) a recording media reader, or the code may be transmitted to controller 125 by a network connection such as an internet, an intranet, an ethernet, a wireless network, or the like. Along with programming code, controller 125 may include stored data for implementing the methods described herein; and may generate and/or store data that records parameters corresponding to the treatment of one or more patients.

Figure 1B:
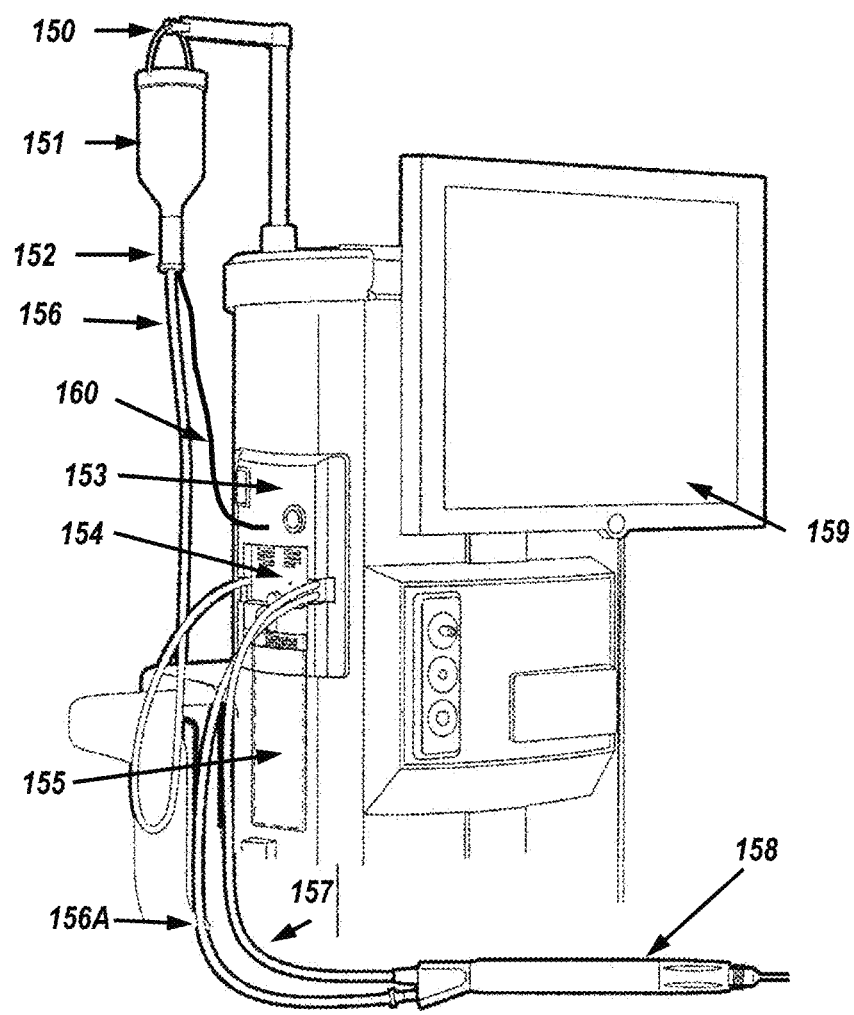
FIG. 1B is a schematic illustrating a surgical eye treatment console under another exemplary embodiment.

Referring now to FIG. 1B, a simplified surgical console is illustrated, where a fluid path may be demonstrated under an exemplary embodiment. In this example, an irrigation source 151 may be configured as a bottle or bag hanging from an IV pole hanger 150. It is understood by those skilled in the art that, while an integrated IV pole is illustrated, other configurations, utilizing standalone/static IV poles, pressurized infusion sources, and/or other suitable configurations, are contemplated by the present disclosure.

An exemplary irrigation path for fluid may be realized via tubing cassette 154 having cassette tubing interface 153, which receives fluid from irrigation source 151 via drip chamber 152. Irrigation line 156A and aspiration line 157 are coupled to handpiece 158. Irrigation fluid may flow from drip chamber 152 through the irrigation tubing into tubing cassette 154. Irrigation fluid may then flow from the tubing cassette through handpiece irrigation line 156A which may be coupled to an irrigation port on handpiece 158. Aspirated fluid may flow from the eye through the handpiece aspiration line 157 back to tubing cassette 154 and into a waste collection bag 155. A touch screen display 159 may be provided to display system operation conditions and parameters, and may include a user interface (e.g., touch screen, keyboard, track ball, mouse, etc.—see controller 125 of FIG. 1A) for entering data and/or instructions to the system of FIG. 1B.

Referring to FIG. 2, an exemplary cassette system showing some of the components and interfaces that may be employed in a phaco system, such as ones illustrated in FIGS. 1A-B. Handpiece 110 may be connected to (or coupled with) the input side of sensor 221, typically by fluid pathways such as fluid pathway 220. Sensor 221 may be a pressure, flow, or a vacuum sensor that measures pressure, flow or vacuum, respectively. In a preferred embodiment, sensor 221 is a pressure sensor. The output side of sensor 221 is connected to valve 202 and also connected to pump 205 within cassette 250 via fluid pathway 222. Valve 202 may be any known valve in the art, e.g. flow selector valve, rotary valve, etc. Valve 202 may also be coupled with pump 205. The exemplary embodiment may configure valve 202 to interface between handpiece 110, vacuum tank 204, pump 205, which may be a peristaltic pump but may be another type of pump, and collection 206. In this configuration, the system may operate valve 202 to connect handpiece 110 with vacuum tank 204 or with pump 205 based on signals received from console 115 resulting from the surgeon's input to user interface 130 or touch screen display 159. In an embodiment of the present invention, handpiece 110 is connected to pump 205 and valve 202 provides fluidic connection and disconnection between handpiece 110 and tank 204. As discussed herein in greater detail, an aspiration level sensor 210 may be communicatively coupled to vacuum tank 204.

The valve 202 illustrated in FIG. 2 may provide a connection between vacuum tank 204 and fluid pathway 222. The exemplary embodiment is not limited to one valve and may be realized using two valves each having at least two output ports, possibly connected together to provide the functionality described herein. For example, a pair of two valves may be configured in a daisy chain arrangement, where the output port of a first valve is directly connected to the input port of a second valve. Console 115 may operate both valves together to provide three different flow configurations. For example, using two valves, valve one and valve two, valve one may use output port one, which is the supply for valve two. Valve two may connect to one of two ports providing two separate paths. When valve one connects its input port to its second output port rather than the output port that directs flow to the second valve, a third path is provided. It is also envisioned that valve 202 may be or comprise one or more pinch valves. The one or more pinch valves may be located along fluid pathway 220, 222 and/or 223, or any other fluid pathway as discussed herein.

Console 115 may also comprise vacuum pressure center 260 which may provide a vacuum through fluid pathway 224 to vacuum tank 204. The vacuum provided through fluid pathway 224 may be regulated by control module 261 based on signals received from aspiration control module 263 which may result from the surgeon's input to user interface 130 and/or based on other signals received from sensor 221. Aspiration control module 263 may also control pump control 264 and allow for operation of pump 205 for the movement of fluid from both the handpiece 110 and the vacuum tank 204 to collector 206 via pathway 225.

In the configuration shown, vacuum pressure center 260 includes a vacuum source 262, such as a venturi pump and an optional control module 261 (and valve (not shown)), but other configurations are possible. In this arrangement, vacuum pressure center 260 may operate to remove air from the top of vacuum tank 204 and deliver the air to atmosphere (not shown). Removal of air from vacuum tank 204 in this manner may reduce the pressure within the tank, which may reduce the pressure in the attached fluid pathway 220, to a level less than the pressure within eye 114. A lower reservoir pressure connected through valve 202 may cause fluid to move from the eye, thereby providing aspiration.

Thus, while a single valve 202 is illustrated in FIG. 2 associated with aspiration, it is to be understood that this illustration represents a valve arrangement, including one or more valves (e.g. flow selector valve, rotary valve, or the like) performing the functionality described herein, and is not limited to a single device or a single valve. In the exemplary sensor 221, a strain gauge or other suitable component may communicate or signal information to console 115 to provide an amount of vacuum sensed in the handpiece fluid pathway 220. Console 115 may determine the actual amount of vacuum present based on the communicated information.

In an embodiment, sensor 221 monitors fluid pressure in the line, and can be used to determine when fluid flow should be reversed, such as encountering a certain pressure level (e.g. in the presence of an occlusion), and based on values obtained from the sensor 221, the system may control valve 202 and the pumps illustrated. It is to be understood that while components presented in FIG. 2 and other drawings of the present application are not shown connected to other system components, such as console 115, they are in fact connected for the purpose of monitoring and control of the components illustrated.

With respect to sensor 221, emergency conditions such as a dramatic drop or rise in pressure may result in a type of fail-safe operation. The exemplary embodiment employs sensor 221 to monitor the flow conditions and provide signals representing flow conditions to the system such as via console 115 for the purpose of controlling components shown including but not limited to valve 202 and the pumps shown. The fluid pathways or flow segments of surgical cassette system 200 may include the fluid connections, for example flexible tubing, between each component represented with solid lines in FIG. 2. In an embodiment, the fluid connections may include molded fluid channels.

Handpiece 110 may be connected to (or coupled with) the output side of irrigation pressure sensor 231, typically by fluid pathways such as fluid pathway 230. Sensor 231 may be a pressure, flow, or a vacuum sensor that measures pressure, flow or vacuum, respectively. In a preferred embodiment, sensor 231 is a pressure sensor. The input side of irrigation pressure sensor 231 is connected to valve 203 within cassette 250 via fluid pathway 232. Valve 203 may be any known valve in the art, e.g. flow selector valve, rotary valve, etc. The exemplary embodiment may configure valve 203 to interface between handpiece 110, irrigation tank 242, pump 240, which may be a peristaltic pump but may be another type of pump, and irrigation fluid source 112. In this configuration, the system may operate valve 203 to connect handpiece 110 with gravity feed or pressurized irrigation based on signals received from console 115 resulting from the surgeon's input to user interface 130.

The valve 203 illustrated in FIG. 2 may provide a connection between irrigation tank 242, irrigation fluid source 112, and fluid pathway 232. The exemplary embodiment is not limited to one valve and may be realized using two valves each having at least two output ports, possibly connected together to provide the functionality described herein. For example, a pair of two valves may be configured in a daisy chain arrangement, where the output port of a first valve is directly connected to the input port of a second valve. Console 115 may operate both valves together to provide three different flow configurations. For example, using two valves, valve one and valve two, valve one may use output port one, which is the supply for valve two. Valve two may connect to one of two ports providing two separate paths. When valve one connects its input port to its second output port rather than the output port that directs flow to the second valve, a third path is provided. It is also envisioned that valve 203 may be or comprise one or more pinch valves. The one or more pinch valves may be located along fluid pathway 230, 232, 233, 234 and/or 235, or any other fluid pathway as discussed herein.

Console 115 may also comprise irrigation pressure center 270 which may provide a positive pressure through fluid pathway 237 to irrigation tank 242 using an applied pressure from pressure source 272. The pressure provided through fluid pathway 237 may be regulated by control module 271 based on signals received from irrigation control module 273 which may result from the surgeon's input to user interface 130 and/or based on other signals received from sensor 231. Irrigation control module 273 may also control pump control 274 and allow for operation of pump 240 for the movement of fluid from irrigation fluid source 112 to collector irrigation tank 242 via pathway 236. As discussed herein in greater detail, an irrigation level sensor 211 may be communicatively coupled to irrigation tank 242.

While a single valve 203 is illustrated in FIG. 2 associated with irrigation, it is to be understood that this illustration represents a valve arrangement, including one or more valves performing the functionality described herein, and is not limited to a single device or a single valve. In the exemplary irrigation pressure sensor 231, a strain gauge or other suitable component may communicate or signal information to console 115 to provide an amount of pressure sensed in the handpiece fluid pathway 230. In another embodiment, depending upon the sensor used, an amount of vacuum or flow may be sensed in the handpiece fluid pathway 230 and communicated to console 115. Console 115 may determine the actual amount of pressure present based on the communicated information.

Figure 3:
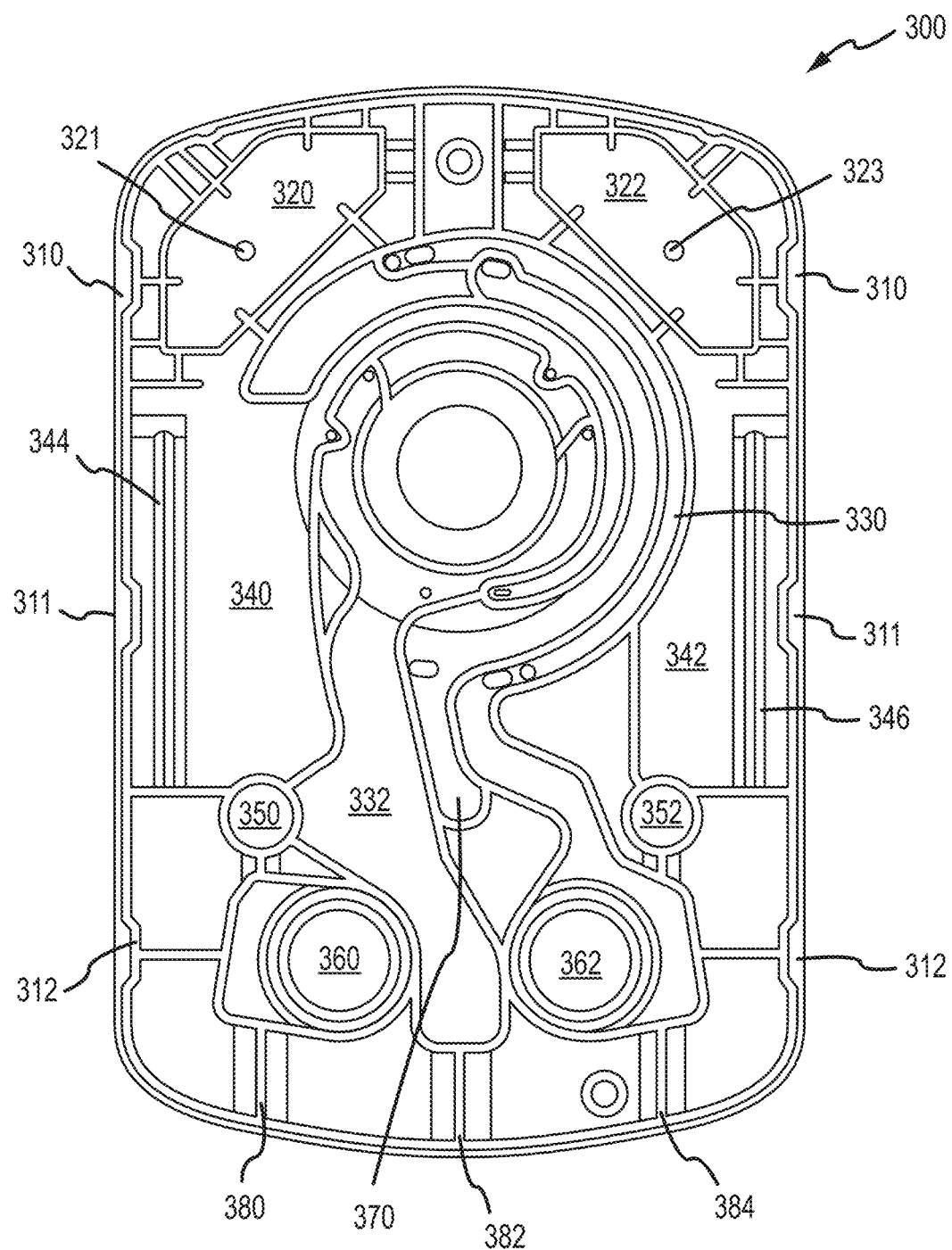
FIG. 3 is a schematic illustrating a cassette under another exemplary embodiment.

FIG. 3 illustrates an exemplary cassette system showing some of the features which may be employed in a phaco system. The illustrated cassette body 300 of cassette 250 is shown from the back side (or second side). Cassette body (or cassette fluidics portion) 300 may include a series of detents, also referred to as notches or catch surfaces, along its outer edge for receiving at least a portion of a retention device which may be associated with a surgical console to facilitate the retaining of the cassette to console and to at least partially assist in properly seating the cassette in the portion of the console meant to receive the cassette. As illustrated in FIG. 3, a cassette may include at least three sets of detents capable of accepting an attachment means provide by the console, such as, for example, upper detents 310, center detents 311, and lower detents 312. As will be described in greater detail below, the detents may be operated on in tandem or in a piecemeal fashion by a retention device of the surgical console.

An exemplary cassette may also include at least one pressurized fluid inlet 321 which may be in fluid communication with at least one filter within filter cavity 320. The pressurized fluid, for example, air, may be supplied to the cassette through fluid inlet 321 and introduced into pressurized irrigation tank 340 and may be in further communication with pressure sensor 360. There may similarly be at least one vacuum inlet 323 which may be in fluid communication with at least one filter within filter cavity 322. The vacuum applied through vacuum inlet 323 may be in communication with vacuum tank 342 and may be in further communication with aspiration channel 330 and aspiration channel 370. Each of the pressurized irrigation tank 340 and vacuum tank 342 may include a level sensing device 344 and 346, respectively.

Irrigation fluid may enter the cassette through inlet 382 and may enter irrigation channel 332. Irrigation valve 350 controls the flow of irrigation fluid and may allow for gravity fed irrigation fluid to be supplied to irrigation outlet 380 from irrigation channel 332 or pressurized irrigation fluid from pressurized irrigation tank 340. In either instance, and even when irrigation valve 350 is in the "off" position relative to both irrigation fluid sources, the amount of pressure associated with the delivery of the irrigation fluid may be measured by irrigation sensor 360. Similarly, aspiration pressure may be measured by the aspiration sensor 362 in close proximity to aspiration inlet 384. Aspiration fluid which may enter though aspiration inlet 384 may enter aspiration channel 330 under pressure produced by at least one peristaltic pump, for example, and may also enter vacuum tank 342 under the influence of at least a partial vacuum through valve 352.

As discussed above, cassette 250 may also include at least two rotary valves which may enable the cassette to change modes for aspiration and irrigation. The aspiration valve switches between flow mode aspiration and vacuum mode aspiration, with an off position between the two mode positions. The irrigation valve switches between gravity mode irrigation and pressurized irrigation, with an off position in between the two modes. In gravity irrigation mode, the bottle height may control the irrigation pressure. The irrigation valve may be turned such that the flow from the bottle flows through the irrigation valve to the pressure sensor and out to the surgical site through the handpiece. Note that the fluidic channel to the irrigation pump may be sealed off by means of the pump rollers sealing off the peristaltic pump bladder. If the irrigation pump is not running, there will be no flow through the pump.

Figure 4:
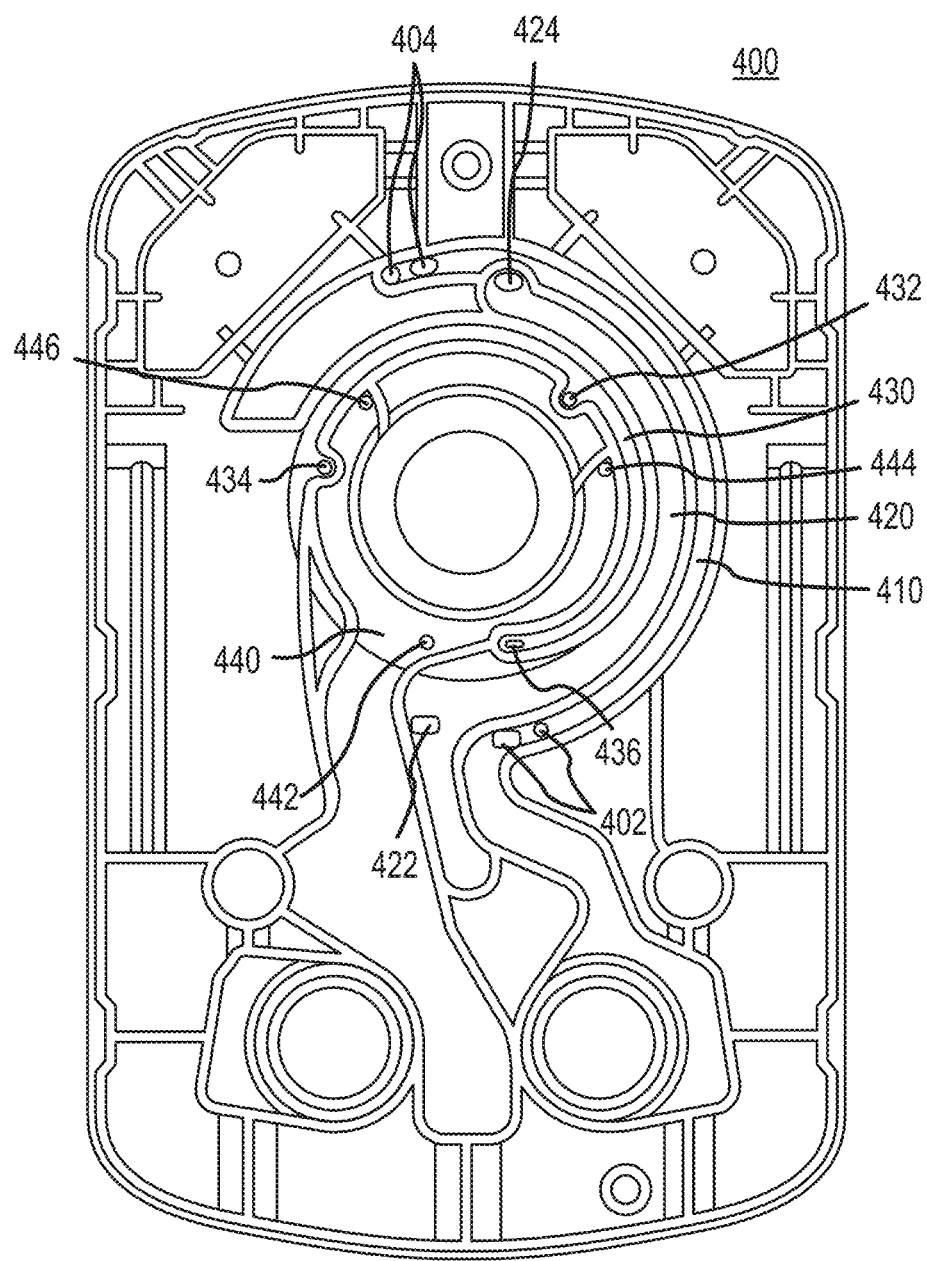
FIG. 4 is a schematic illustrating a cassette under another exemplary embodiment.

The present invention may include a cassette having an internal flow interface as at least partially illustrated in FIG. 4. FIG. 4 illustrates the back side (or second side) of a cassette 250. Such a cassette flow interface may receive fluids, as described in greater detail herein, which may be driven by bladders joined to cassette 250 to move fluids through the cassette. Cassette fluidics portion (or cassette body) 400 may include a plurality of channels, each with at least one inlet and one outlet. Each channel formed in the cassette fluidics portion 400. For example, channel 410 may have outlet 402 and outlet 404. Each of outlet 402 and 404 may include a plurality of openings in which fluids may enter and exit the channel 410. Similarly, channel 420 may have at least one inlet 424 and inlet 422. When used for transmitting aspiration liquids during cassette engagement, fluids may travel through channel 410, pass through outlets 402 and 404 and then enter drain channel 420 through inlet 424 and inlet 422. In an embodiment of the present invention, the outlets from channel 410 may be in fluid communication with specific inlets in channel 420. Each inlet and outlet described herein may be shaped to control flow and turbulence of the fluid to be moved through the cassette and may be circular, oval, and/or any shape which may impact fluid flow. As would be appreciated by those skilled in the art, the flow may be reversed and may be used for both irrigation and aspiration functions as desired by the user.

The cassette fluidics portion 400 may include channels that allow for simultaneous flow through a variety of inlets and outlets within the same channel network to provide desired flow characteristics, such as control of flow and turbulence. For example, irrigation fluid may enter the cassette 250 through channel 440 with fluid exiting through outlets 442, 446, and 444. The fluid may enter channel 430 through inlets 434, 432, and 436. In an embodiment of the present invention, the outlets from channel 440 may be in fluid communication with specific inlets in channel 430. Each inlet and outlet described herein may be shaped to control flow and turbulence of the fluid to be moved through the cassette and may be circular, oval, and/or any shape which may impact fluid flow. As would be appreciated by those skilled in the art, the flow may be reversed and may be used for both irrigation and aspiration functions as desired by the user.

In some embodiments, as illustrated in FIG. 4, channel 410 may have an inlet from an aspiration tube connection to a cassette, such as connection 384 and pressure sensor area 362 of FIG. 3. The ports 402 and 404 of FIG. 4 may be channel 410 outlets. In some embodiments, channel 410 outlets may also be bladder inlets (i.e., inlet is larger, bypass is smaller). Ports 402 may be inlet ports to aspiration bladder section 506. In some embodiments, port 404 may be a bypass port to 505. Port 424 may be a bladder outlet port from 506 and port 422 may be the outlet for 505. In some embodiments, channel 420 may be an aspiration drain channel with the drain connected to a drain hole 370. In FIG. 4, the aspiration bladder rollers may be configured to rotate counter-clockwise.

In some embodiments of the present invention, an irrigation pump, which may have clockwise rotating rollers in FIG. 4, may supply fluid from 382 into channel 332. Ports 442 of bladder section 512, port 446 of bladder section 511, and port 444 of bladder section 510 may be irrigation bladder inlet ports. The irrigation outlet ports may include: port 434 (bladder section 512), port 432 (bladder section 511) and port 436 (bladder section 510), and direct flow from the bladder to the irrigation tank 340, through channel 430.

Figure 5A:
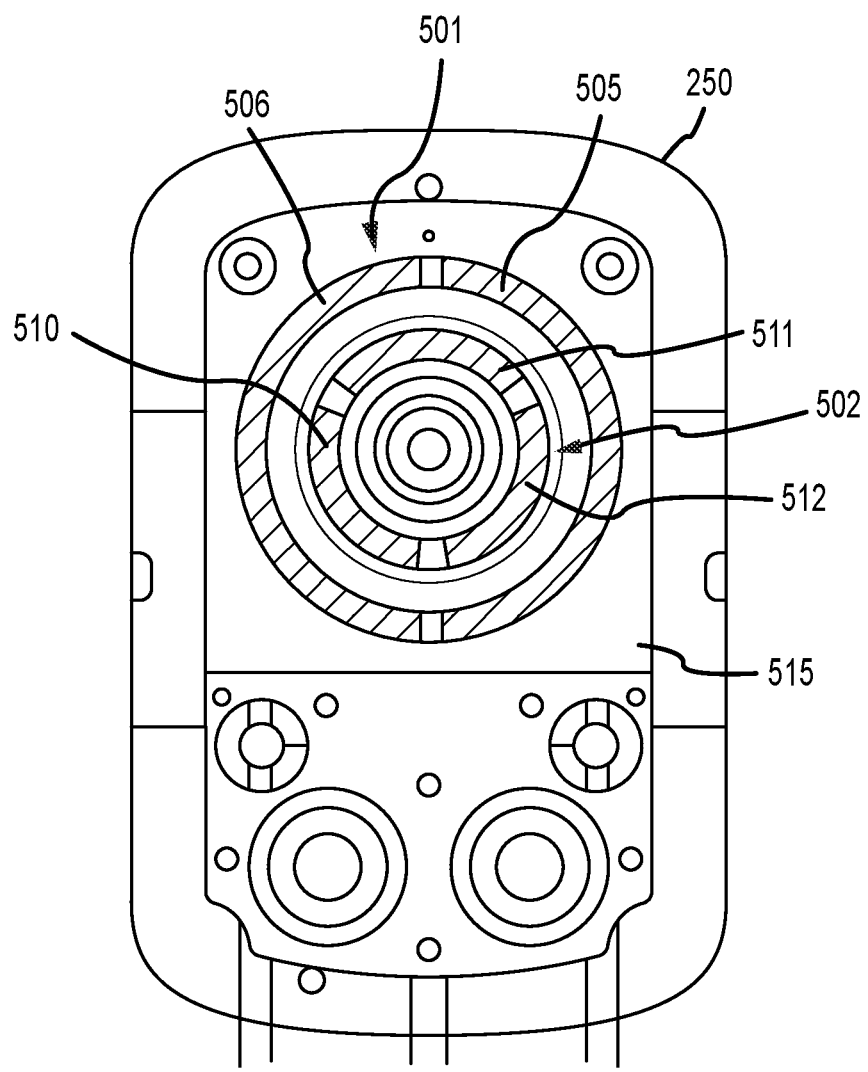
FIG. 5A is a schematic illustrating a cassette under another exemplary embodiment.

In an embodiment of the present invention, and as illustrated in FIG. 5A, the front side (or a first side) of a cassette 250 is shown. The cassette 250 may include an assembly of bladders including at least one aspiration bladder 501. For example, aspiration bladder 501 may include two sections, such as bladder section 505 and bladder section 506. Further, the assembly of bladders may include an irrigation bladder 502. The irrigation bladder 502 may include three sections, such as bladder section 510, bladder section 511, and bladder section 512.

Figure 5B:
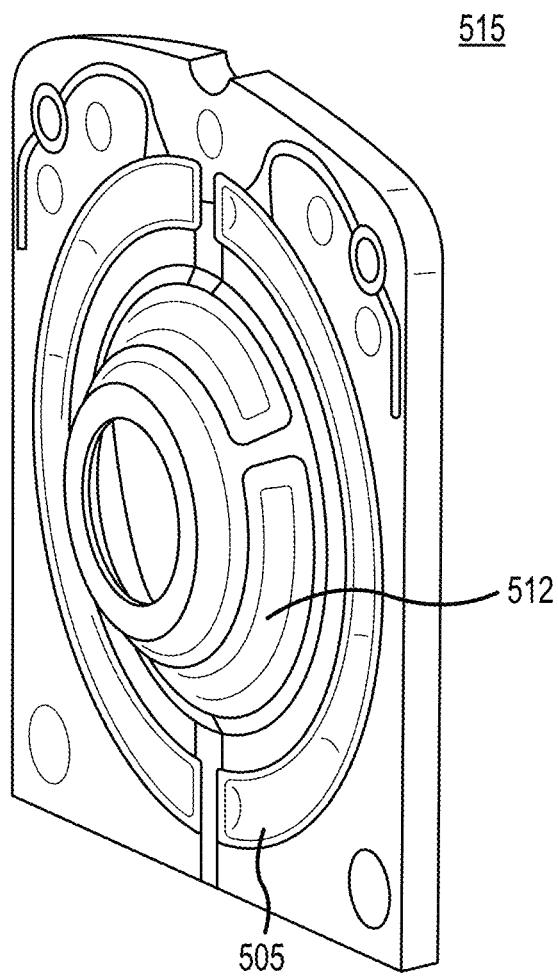
FIG. 5B is a schematic illustrating a portion of a cassette under another exemplary embodiment.

An assembly of compressible bladders as illustrated in FIG. 5A on assembly 515 may be communicatively coupled to the back of cassette fluidics portion 400 and may form a part of cassette 250 may comprise a plurality of bladders which may form at least the top portion of a fluid channel which may interoperate with the fluid channels illustrated in cassette fluidics portion 400. For example, bladder section 505 may communicatively connect outlet 404 and inlet 422. Similarly, bladder section 506 may communicatively connect outlet 402 and inlet 424. Bladder section 510 may communicatively connect outlet 444 and inlet 436, bladder section 511 may communicatively connect outlet 446 and inlet 432, and bladder section 512 may communicatively connect outlet 442 and inlet 434. As illustrated in FIG. 5B, each of the bladders of assembly 515 may form a channel when placed against a planar surface, which channels may be linearly uniform and/or have a variable volume over their respective lengths. In some embodiments, an aspiration bladder 501 may be mounted to a flat surface and an irrigation bladder 502 may be mounted to and make a channel with a conical surface.

Figure 5C:
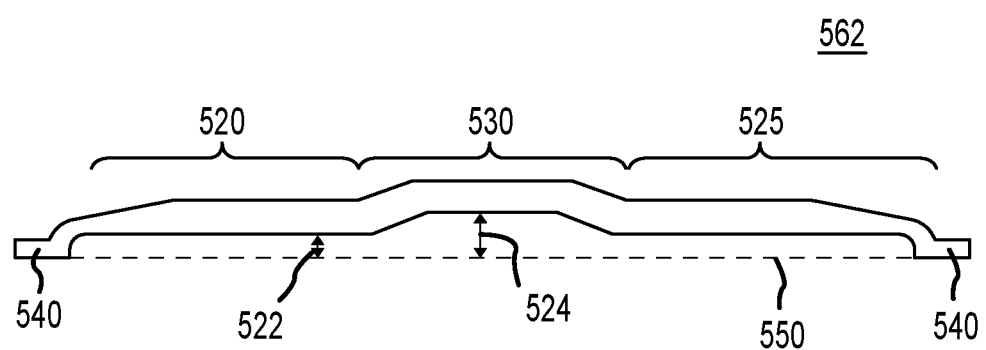
FIG. 5C is a schematic illustrating side view of a portion of a cassette under another exemplary embodiment.

In an embodiment of the present invention, as illustrated in FIG. 5C, each bladder section may have at least a minimum uniform channel volume throughout the channel as measured by a measured height formed between the bladder 562 and a planar surface represented by line 550. The minimum uniform height may be greater than about 0.5 mm and may be less than about 3.5 mm (although each channel may be non-uniform in height and/or radius and may be designed to hold a specific volume of fluid). The minimum uniform radius of a channel may be greater than about 1.5 mm and may be less than about 3.5 mm. In an embodiment of the present invention, the minimum radius at position 522 may be 2.25 mm. In an embodiment of the present invention, at least one second radius may be found within the bladder section, such as a height of 3.5 mm at position 524. The at least one second length portion 530 may be bordered on each side by first length portion 520 and third length portion 525. The change in height between first length portion 520 and second length portion 530 may occur gradually over the length of first length portion 520, for example, or may occur over a small distance between the two portions sufficient to accommodate an angular rise. For example, such an angular rise may be equivalent to about 118 degrees from the top-most portion of first height portion.

In an embodiment of the present invention, and as further illustrated in FIG. 5C, bladder section 562 may have at least two foot portions 540 located in either end of the bladder section which may be at least partially in communication with planar surface 550. The top of bladder section 562 may not follow the same geometry as the inner channel forming portion and may include additional angular elements. For example, first portion 520 may include a sloped portion on its proximate end while second portion 530 may include at least two sloped portions to accommodate any underlying channel height rise as between first portion 520 and third portion 525. In an embodiment of the present invention, the thickness of the bladder section may be substantially uniform over most of its length and may be generally concave over the channel forming portion of the bladder.

Figure 5D:
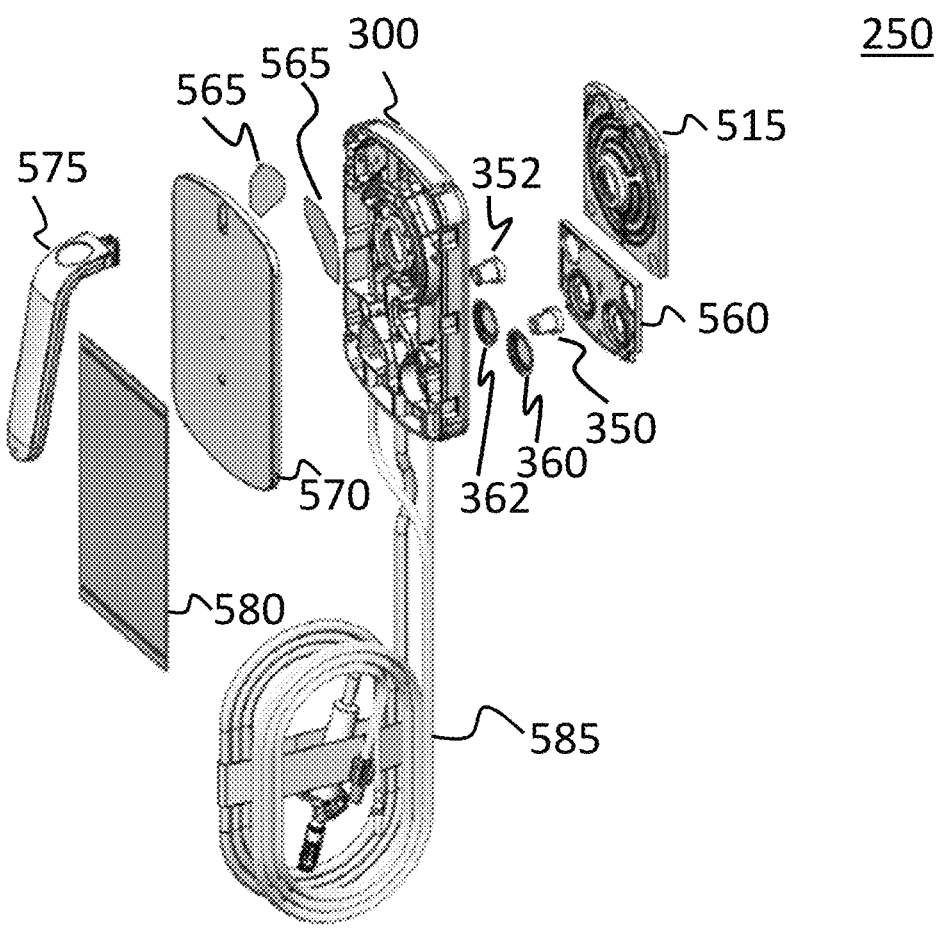
FIG. 5D is a schematic illustrating a cassette under another exemplary embodiment.

As further illustrated in FIG. 5D, in an embodiment of the present invention, cassette 250 may comprise cassette body 300 which may include on the front face assembly 515 and panel 560. Valves 352 and 350 may be at least partially housed within cassette body 300 and in an embodiment, may be at least partially retained in cassette body 300 by panel 560. Similarly, pressure sensors 360 and 362 may be placed in communication with cassette body 300 and in an embodiment, may be sealed and/or retained by panel 560. As would be appreciated by those skilled in the art, assembly 515 and panel 560 may be combined into a single article and may be mechanically and/or chemically fastened to cassette body 300. Tubing assembly 585 may include fluid pathways for both irrigation and aspiration, for example, to fluidly couple with a surgical handpiece. Tubing assembly 585 may be preferably connected to the bottom of cassette body 300 for ease of use but may be joined at any position to cassette body 300 as may be considered useful by those skilled in the art.

The back side of cassette body 300 may include filters 565 and may be sealed by plate 570. As would be appreciated by those skilled in the art, plate 570 may be mechanically and/or chemically fastened to cassette body 300, for example. Drain bag 580 may be fastened to the exterior of plate 570 and may be in fluid communication with one or more fluid conduits within cassette body 300. Fluid from within the cassette body 300 may be expelled into fluid bag 580, which may be replaceable and/or itself drained to allow for the expelling of more fluid than could be held in the volume of a single fluid bag 580. Panel 570 may also have attached thereto handle 575 which may provide for easier handling of cassette 250, for example during insertion and removal from a surgical console. Handle 575 may be attached at one or more points on panel 570 and may take any number of forms, such as, for example, a ring, square, or other geometric shape.

Figure 6A:
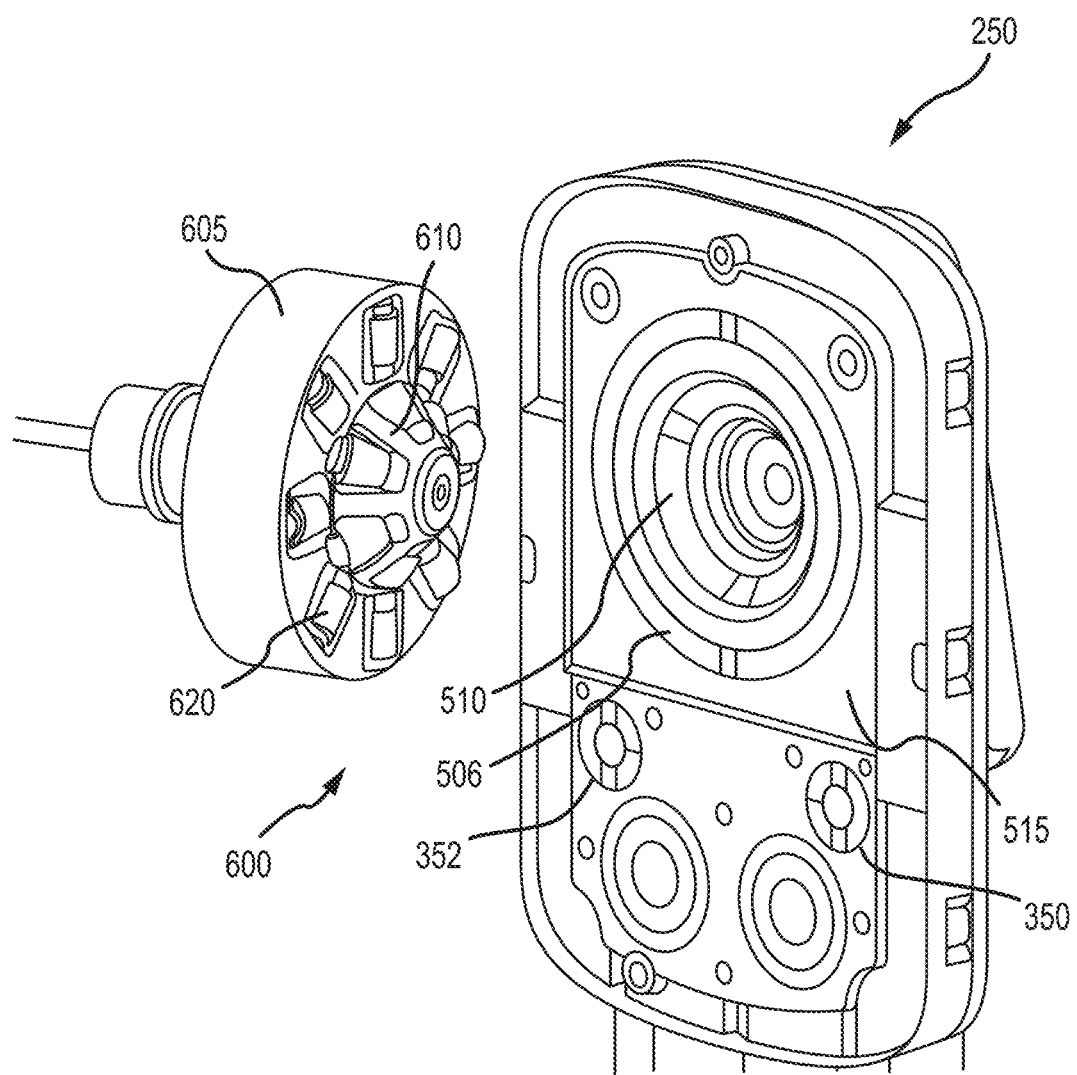
FIG. 6A is an isometric view illustrating a portion of a pump head and a cassette under another exemplary embodiment.

The bladder assembly of the present invention may have portions offset from one another and may have portions in multiple planes, for example. One or more of the bladders may include conic portions, cylindrical portions, and wavy portions, for example. In an embodiment of the present invention, a first bladder assembly may be in a first plane and a second bladder assembly may be in a second plane. For example, as illustrated in FIG. 6A in an isometric view, the console engagement side of cassette 250 may include assembly 515 which may be shaped to compliantly accept a roller head assembly 600 (which is shown in repose from a surgical console). The roller head assembly 600 may comprise at least two pump heads, each of which may operate independently from each other. The outermost pump head, pump head 605, for example, may comprise a vertically disposed surface (relative to cassette 250) which may include a plurality of roller assemblies, such as roller assembly 620. An inner pump head, pump head 610, may have a non-linear shape and may, for example, be shaped as a conical frustum, for example. Each pump head may also be spring loaded and or otherwise moveable such that each pump head may have the ability to adjust to the orientation of a mating cassette. In an embodiment of the present invention, each roller assembly may contain rollers having geometry to minimize slip between a portion of the roller assembly surface and a bladder. For example, a roller may have a conical geometry which allows the roller axis to pass approximately through the center of roller rotation.

Figure 6B:
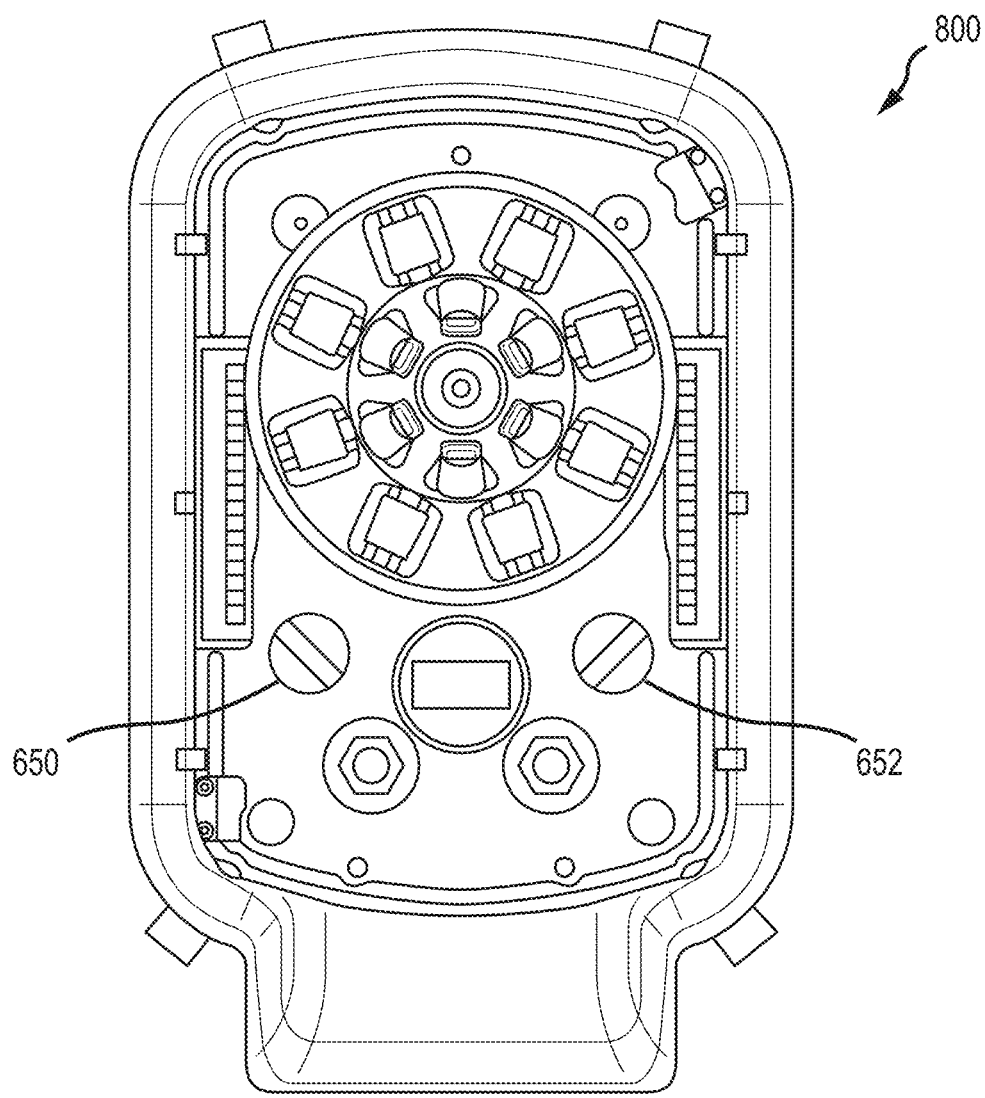
FIG. 6B is a front view illustrating a portion of a cassette under an exemplary embodiment.

FIG. 6B shows an illustration of the console interface or cassette receptacle for mating a single use cassette with the console. The irrigation and aspiration valves on the single use cassette will center on each of irrigation valve lever 650 and aspiration lever valve 652, respectively, once the cassette has been mounted to the console interface 800. As discussed herein, each one of the valve levers may operate responsive to at least one received signal indicative of at least one parameter. Such parameters may include, for example, fluid pressure and fluid volume associated with fluid in the system, whether or not the fluid is in communication with either valve. Similarly, a parameter associated with at least one of a vacuum, a positive pressure and gravity, may also be used with the present invention.

In an embodiment of the present invention each of the irrigation valve and aspiration valve may be in fluid communication with each other. The valves of the present invention may also be fluidly connected to a line under vacuum and/or to atmosphere. Similarly, the valves of the present invention may receive one of either pressurized fluid or gravity-fed fluid and may provide a vent for at least one fluidly connected line. In an embodiment of the present invention, either one of the valves may be partially open to at least one line communicatively connected thereto.

Figure 7A:
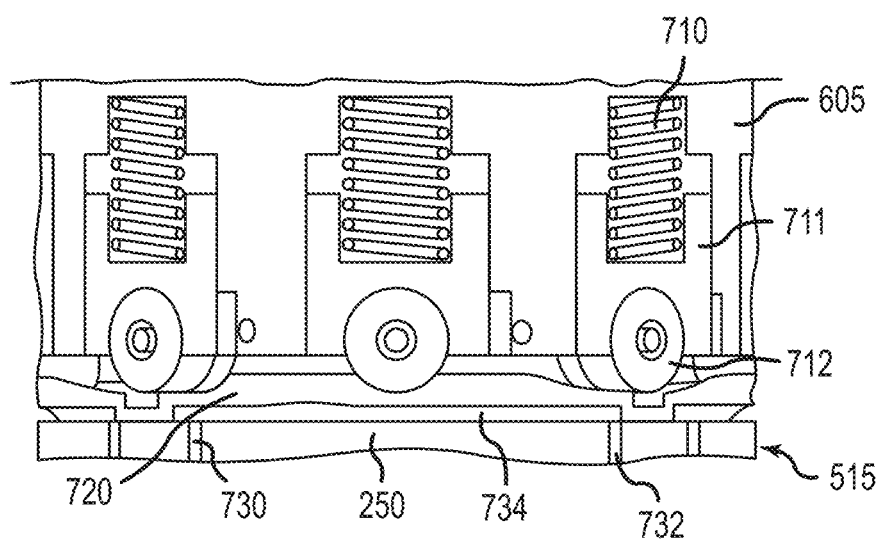
FIG. 7A is an illustration of a portion of a pump head and a cassette under another exemplary embodiment.
Figure 7B:
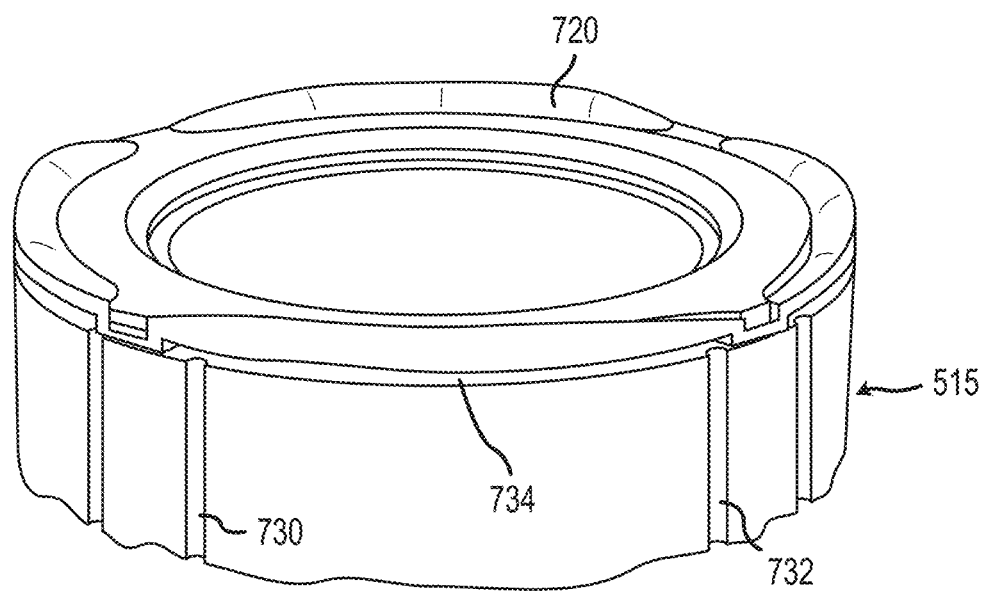
FIG. 7B is an illustration of a portion of a cassette under another exemplary embodiment.

In an embodiment of the present invention, when cassette 250 is seated against roller head assembly 600, the roller assemblies of the pump heads may communicatively engage the bladders of assembly 515. For example, as shown in a cut-out view as illustrated in FIG. 7A and as discussed above, pump head 605 may comprise a roller assembly which may further comprise a roller 712, roller body 711 and a spring means 710. Roller 712 may be movably affixed to roller body 711 and may be under a downward force provided by spring means 710, which itself may be affixed to both the pump head 605 and roller body 711. Each roller 712 may engage a portion of a bladder 720 which may be removably affixed to a portion of assembly 515 and may engage a bladder with sufficient force as to deform the bladder and cause fluid flow within the channel formed between the bladder 720 and the assembly 515. In an embodiment of the present invention, a roller may deform the bladder is a manner sufficient to stop all fluid flow Further, as illustrated in FIGS. 7A and 7B, a portion of assembly 515 may include ports, such as ports 730 and 732, which may correspond to inlets and outlets of fluid channels located on the opposite side of assembly 515 as discussed above. Shown without the pump head, the portion of assembly 515 may comprise multiple bladders, each creating a flow channel 734 between the bladder and assembly 515.

Although the illustration shows two ports into channel 734, as contemplated by the present invention, any number of ports may be provided.

Figure 8:
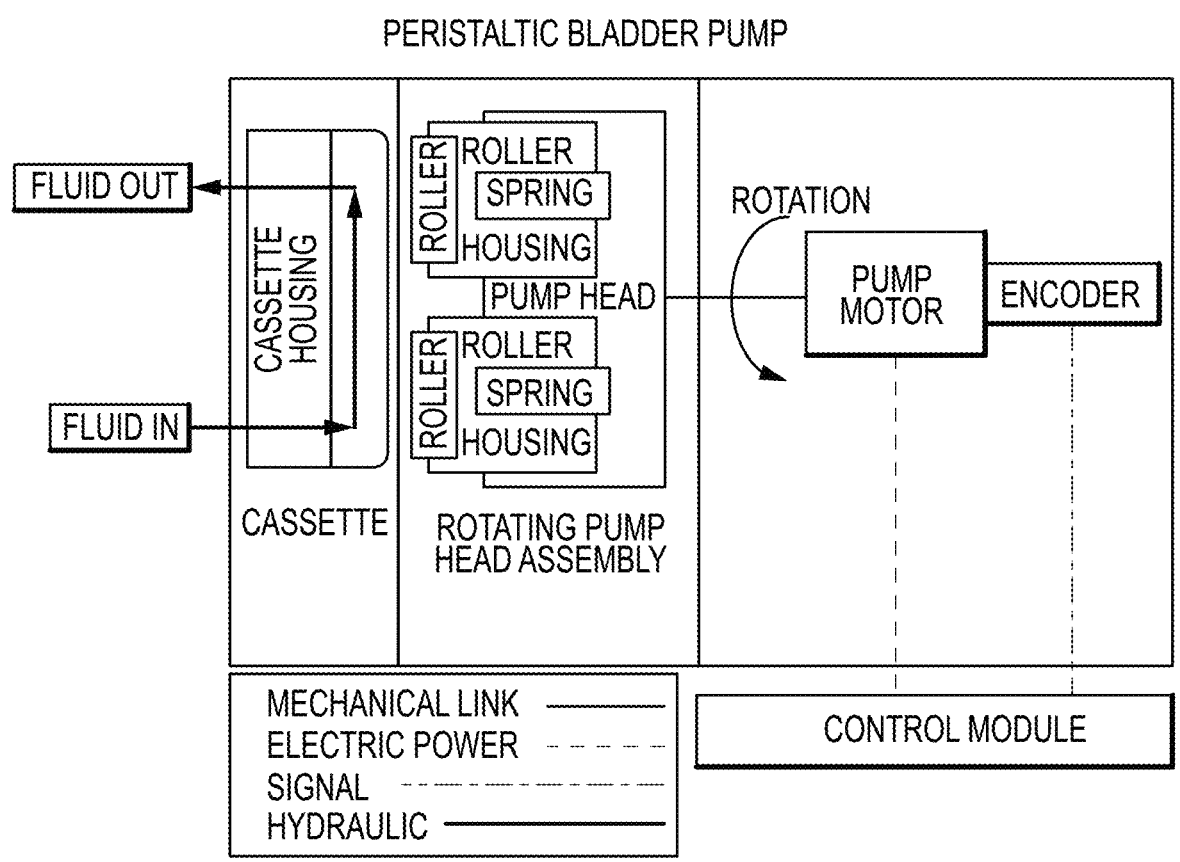
FIG. 8 is a schematic illustration of a cassette and pump for use with an eye treatment system under one embodiment.

As illustrated in the simplified block diagram of FIG. 8, a control module associated with a surgical console may control at least one motor which may control the at least two pump heads. As discussed above, each individual pump head may be independently rotated and controlled from a dedicated motor and/or a single motor and may further be responsive to at least one spring mechanism to allow for adjustments in orientation of the pump heads relative to an engaged cassette. In an embodiment of the present invention, each pump head may be controlled by a dedicated motor placed in line along a shaft which may itself have at least two independent drive shafts. The pump heads may provide peristaltic flow within the engaged cassette and provide rotation in either a forward or reverse direction. As would be known to those skilled in the art, the control module may receive signals from the pump motor(s) and associated pump encoder(s) responsive to signals received from the surgical console and/or attached devices, such as, for example, a foot pedal and a surgical instrument.

The encoder may comprise an index line output on the motor shaft. There may be two hard stops within the cassette at the following positions: for irrigation at: pressurized irrigation connected and gravity irrigation connected; and for aspiration at: vacuum tank connected and vacuum tank disconnected. There may be a third position on the irrigation valve of irrigation off (no irrigation flow out of the cassette). It is possible to use the index line of the encoder or an absolute position encoder to know the physical orientation of the valve driver head. This may require alignment of the index position to the pump driver head position during manufacturing. A spring in the valve driver head may be used to mate with the rotary valve in the cassette without knowing the orientation of the valve driver head. This would rely on the spring loading to be reliable over wear and would allow the heads to be resistant to any misalignment with a part of the pump head and the cassette.

Similarly, during startup of the console, the motor may spin until the index line is activated, which may be used to place the valve driver head in a specific orientation and zero the encoder counts and motor driver step position. On cassette insertion, the valve stepper motor may spin so that the spring-loaded valve driver head may mate with the cassette. The motor may continue spinning until it hits a hard stop in the cassette. There may be a timeout or certain number of rotations to allow before setting an error that the valve head has not mated. The motor position at the hard stop (reported from either/both the motor driver step position and/or the encoder position) may be saved for returning to that position later during operation. The motor may rotate in the opposite direction to hit the second hard stop. When the motor contacts the hard stop (detect from the encoder and from step loss detection in the motor driver), the encoder and/or step position may be saved for returning to that position later during operation. The angular travel range between hard stops can be checked for an error condition (if there is foreign material or stiction stalling the motor before a hard stop), and the middle irrigation position of off can be set as the middle of the irrigation hard stop range.

Safe state for the system may be when gravity irrigation is connected and aspiration is stopped. The irrigation valve may need to return to the gravity position in a safe state error condition. In an embodiment, for example, the system may require either having the system battery backup always being present and sufficient for the 10 seconds of operation or providing enough capacitive hold on the 24V line and an indication that power is going down to move the valve to the intended position if the battery backup is insufficient.

In an embodiment of the present invention, a peristaltic pump may consist of elements that pinch and articulate along the closed flexible fluid conduit created, in part, by an aspiration bladder, to force fluid through the conduit. At least two pinchers, such as rollers, wipers, cams, or shoes, may sequentially engage and pinch the conduit against a rigid structure and articulate along the conduit length to cause fluid flow. Before the lead pincher disengages the conduit, a subsequent pincher may engage the conduit and articulate along it to ensure continued fluid flow. During disengagement, a momentary disruption of downstream flow may occur as fluid fills the void as the conduit regains its pre-deformed shape. Similarly, upstream flow may be disrupted as the subsequent pincher engages the conduit and fluid is displaced. These disruptions may result in flow and/or pressure pulses both upstream and downstream flow. The present invention may eliminate such pulses upstream of the pump rather than merely mitigating such pulsation.

As may be known to those skilled in the art, one typical method to mitigate such pulsation may involve shaping a rigid structure to control the manner in which the pinchers engage and disengage the conduit to lessen the severity of pulsation by increasing pulse duration. Similarly, larger sections of bladder tubing may be used, as well as varying pump speed to cancel out known pulsations. Pulsation may also be diminished by employing a void in a rigid structure portion such that as three pinchers are simultaneously engaging the flexible conduit, the middle pincher momentarily encounters the rigid structure void thus reducing or eliminating its pinch before fully re-engaging the conduit. The manner in which the pincher encounters the void may mitigate pulsation upstream or downstream of the pump. Further still, other methods may employ a length of semi-circular flexible open conduit with capped ends mounted and sealed to a rigid structure, with inlet and outlet flow are provided by ports in the rigid structure under the flexible conduit. In such embodiments, the ends of the fluid volume of these conduits may be tapered to control the manner in which the pinchers engage and disengage the conduit. In embodiments using a semi-circular open conduit, grooves in the rigid structure near the ends of the conduit may provide fluid bypass under the pinched conduit which lessens the severity of and increases the duration of pulses.

In an embodiment of the present invention, a pulseless peristaltic pump may eliminate pulses upstream (inlet side) by providing a flexible conduit of varying volume or displacement in the section of conduit that is engaged by the pinchers. The pulse caused by the subsequent roller engaging the flexible conduit may be absorbed inside of this length of flexible conduit which may result in pulseless flow into the pump. The pulse is essentially cancelled at its source. The present invention is easy to manufacture and does not require additional pump parts. In an embodiment of the present invention, roller tracks may be employed to promote constant pump speed and pulseless flow and decreases the cost and complexity of the pump motivating drive.

In an embodiment of the present invention, at least two separate flexible conduits, created in part by bladders, are arranged in a circular pattern, plumbed together in parallel, and engaged by a pump roller head, as illustrated by FIG. 6. Each conduit may consist of a short length of semicircular or similarly shaped flexible open conduit (such as a bladder) that may be mounted and sealed to a cassette so that the cassette and bladder together form a fluid flow path, such as flow channel 734 as illustrated in FIG. 7B. Inlet and outlet flows are provided by ports in the cassette under each end of the bladders.

The bladder sections may be plumbed in parallel inside the cassette while a motor-driven rotating pump head with eight pump roller heads, for example, engages the cassette and bladders. The rollers may be arranged in a circular pattern with the rotational axis of each roller intersecting the pump head rotational axis. The rollers may rotate along a flat and annular path on the front face of the cassette while simultaneously manipulating the bladders. In an aspiration bladder, for example, upstream or inlet pulseless flow may be achieved by shaping the bladder so that the fluid volume of the conduit behind the first roller increases incrementally and exactly to absorb the fluid displaced as the second roller proceeds to pinch the bladders, as illustrated in FIG. 7A, for example. Thus, the pulse caused by the second roller may be absorbed inside of the bladder and may result in pulseless flow into the pump, which may be embodied by a bulge in the bladder.

In an embodiment of the present invention, bypass ports in the cassette may be placed slightly downstream of the location where the rollers initially seal a bladder against the cassette. These ports may promote pulseless performance by precisely defining pumping handoff from the first roller to the second. In an embodiment of the present invention, pump speed may be held constant through each pump rotation pump to avoid flow and pressure variation. Two features of the pump of the present invention promotes constant speed by reducing torque pulses caused by interaction between rollers and cassette. Rollers are primarily supported by the front face of the cassette. This mitigates torque variation by providing a smooth, flat, and rigid roller track surface. The bladder wall thickness is tapered at each end of the bladders which effectively provide ramps instead of bumps where the rollers engage and disengage the bladders, as illustrated in FIG. 5C, for example.

In an embodiment of the present invention, a conical flexible open conduit with at least one fluid path of semi-circular or similar cross-section mounted and sealed to the inside or outside of a conical structure and manipulated by rollers in a rotary pump head may be used. Similarly, in an embodiment of the present invention, a cylindrical flexible open conduit with at least one fluid path of semi-circular or similar cross-section mounted and sealed to the inside or outside of a cylindrical structure and manipulated by rollers in a rotary pump head. In an embodiment of the present invention, a linear flexible open conduit with at least one fluid path of semi-circular or similar cross-section mounted and sealed to a flat or curved structure and manipulated by a linear pump head such as rollers that are linked together in a chain driven by pulleys or sprockets. Similarly, in an embodiment of the present invention, a flexible conduit such as a round tube pinched against a flat or curved structure and manipulated by a linear pump head such as rollers that are linked together in a chain driven by pulleys or sprockets.

Those of skill in the art will appreciate that the herein described apparatuses, engines, devices, systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the disclosure, any appended claims and any equivalents thereto.

In the foregoing detailed description, it may be that various features are grouped together in individual embodiments for the purpose of brevity in the disclosure. This method of disclosure is not to be interpreted as reflecting an intention that any subsequently claimed embodiments require more features than are expressly recited.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A system for distributing fluid in a surgical cassette, comprising:
    a partially deformable bladder disposed on, and partially in contact with a rigid surface, wherein the bladder forms a channel above a portion of the rigid surface;
    a first port and a second port in fluid communication with the channel;
    wherein the channel comprises a portion of the bladder having a cross section comprising: first and second bottommost portions in contact with the rigid surface,
    a first intermediate portion having a first intermediate portion bottom side located a first distance above the rigid surface,
    a second intermediate portion having a second intermediate portion bottom side located the first distance above the rigid surface, and
    a top portion located between the first intermediate portion and the second intermediate portion and having a top portion bottom side located a second distance above the rigid surface, wherein
    the rigid surface is in the form of a straight line in the cross section and no portion of any of the first intermediate portion, the second intermediate portion and the top portion are located below the straight line; and
    wherein at least two pump head rollers are engaged with the at least partially deformable bladder.

2. The cassette of claim 1, wherein one of the at least two pump head rollers substantially stops fluid flow through the first port.

3. The cassette of claim 1, wherein one of the at least two pump head rollers substantially stops fluid flow through the second port.

4. The cassette of claim 1, wherein the bladder comprises a bevel located proximate to each end of the bladder.

5. The cassette of claim 1, wherein the bladder is composed of rubber or silicone.

6. The cassette of claim 1, wherein the first distance is about 0.5 mm.

7. The cassette of claim 1, wherein the first distance is about 0.75 mm.

8. The cassette of claim 1, wherein the second distance is about 3.0 mm.

9. A method for distributing fluid in a surgical cassette, comprising:
    providing a first channel having at least one wall formed by a bladder and a second channel; and
    partially deforming the bladder of the first channel;
    wherein the bladder forms the first channel above a portion of a rigid surface;

wherein the first channel comprises a portion of the bladder having a cross section comprising: first and second bottommost portions in contact with the rigid surface,
a first intermediate portion having a first intermediate portion bottom side located a first distance above the rigid surface,
a second intermediate portion having a second intermediate portion bottom side located the first distance above the rigid surface, and
a top portion located between the first intermediate portion and the second intermediate portion and having a top portion bottom side located a second distance above the rigid surface, wherein
the rigid surface is in the form of a straight line in the cross section and no portion of any of the first intermediate portion, the second intermediate portion and the top portion are located below the straight line;
wherein the deforming of the bladder allows fluid to flow between the first and second channels.

10. The method of claim 9, wherein the deforming causes peristaltic fluid flow.

11. The method of claim 9, wherein the first channel is in fluid communication with the second channel through at least two ports.

12. The method of claim 9, wherein one of the two pump head rollers partially deform the bladder.

13. The method of claim 9, wherein one of the two pump head rollers substantially stop fluid flow through the first channel.

14. The method of claim 9, wherein the bladder comprises a bevel located proximate to each end of the bladder.

15. Method of claim 9, wherein the first distance is about 0.5 mm.

16. The method of claim 9, wherein the first distance is about 0.75 mm.

17. The method of claim 9, wherein the second distance is about 3.0 mm.

18. The method of claim 9, wherein the first channel is disposed on a first side of the surgical cassette and the second channel is disposed on a second side of the surgical cassette, and wherein the first channel and the second channel are fluidly coupled through at least two ports.

* * * * *